(12) United States Patent   (10) Patent No.: US 6,570,265 B1
Shiraishi et al.   (45) Date of Patent: May 27, 2003

(54) HYBRID VEHICLE DRIVEN BY COMPOSIT TORQUE GENERATED BY AN INTERNAL-COMBUSTION ENGINE AND AN ELECTRIC MOTOR, AND METHOD OF OPERATING SAME

(75) Inventors: Takuya Shiraishi, Hitachinaka (JP); Toshiharu Nogi, Hitachinaka (JP); Minoru Oosuga, Hitachinaka (JP); Yoshihiro Sukegawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/485,398

(22) PCT Filed: Apr. 26, 1999

(86) PCT No.: PCT/JP99/02209
§ 371 (c)(1),
(2), (4) Date: Feb. 9, 2000

(87) PCT Pub. No.: WO99/56011
PCT Pub. Date: Nov. 4, 1999

(30) Foreign Application Priority Data

Apr. 28, 1998 (JP) .......................... 10-118176

(51) Int. Cl.[7] .......................... F02N 11/06; H02P 9/04; B60K 1/00
(52) U.S. Cl. .................... 290/40 C; 180/65.2
(58) Field of Search ................ 290/40 C, 45; 180/65.2; 123/295, 430; 701/102

(56) References Cited

U.S. PATENT DOCUMENTS

| 4,106,448 | A | * | 8/1978 | Noguchi et al. | 123/119 LR |
| 4,215,659 | A | * | 8/1980 | Lowther | 123/68 |
| 4,765,293 | A | * | 8/1988 | Gonzalez | 123/259 |
| 5,560,326 | A | * | 10/1996 | Merritt | 123/51 AA |
| 5,722,911 | A | * | 3/1998 | Ibaraki et al. | 477/3 |
| 5,730,675 | A | * | 3/1998 | Yamaguchi | 475/2 |
| 5,784,879 | A | * | 7/1998 | Dohta et al. | 60/276 |
| 5,881,559 | A | * | 3/1999 | Kawamura | 60/59.7 |
| 5,927,416 | A | * | 7/1999 | del Re et al. | 180/65.2 |
| 6,057,605 | A | * | 5/2000 | Bourne et al. | 290/40 A |
| 6,161,530 | A | * | 12/2000 | Kakizaki et al. | 123/674 |
| 6,209,672 | B1 | * | 4/2001 | Severinsky | 180/65.2 |
| 6,213,234 | B1 | * | 4/2001 | Rosen et al. | 180/65.3 |
| 6,230,683 | B1 | * | 5/2001 | zur Loye et al. | 123/27 GE |

FOREIGN PATENT DOCUMENTS

DE  0225026 A1 * 10/1987

* cited by examiner

*Primary Examiner*—Nestor Ramirez
*Assistant Examiner*—Julio Gonzalez Ramires
(74) *Attorney, Agent, or Firm*—Crowell & Moring LLP

(57) ABSTRACT

A hybrid vehicle driving system has a transmission means (22) for selectively transmitting the output torque of an internal-combustion engine (10), the output torque of an electric motor (19) or a composite torque produced by combining the respective output torques of the internal-combustion engine (10) and the electric motor (19) to driving wheels. The hybrid vehicle driving system includes a turbogenerator (7) capable of converting energy of the exhaust gas discharged from the internal-combustion engine (10) into electric energy, and an electrical connecting means (1) for electrically connecting the turbogenerator (7) to the electric motor (19). The hybrid vehicle driving system is controlled so that the engine (10) operates on a lean mixture for the largest possible part of the total operating time of the engine (10).

5 Claims, 29 Drawing Sheets

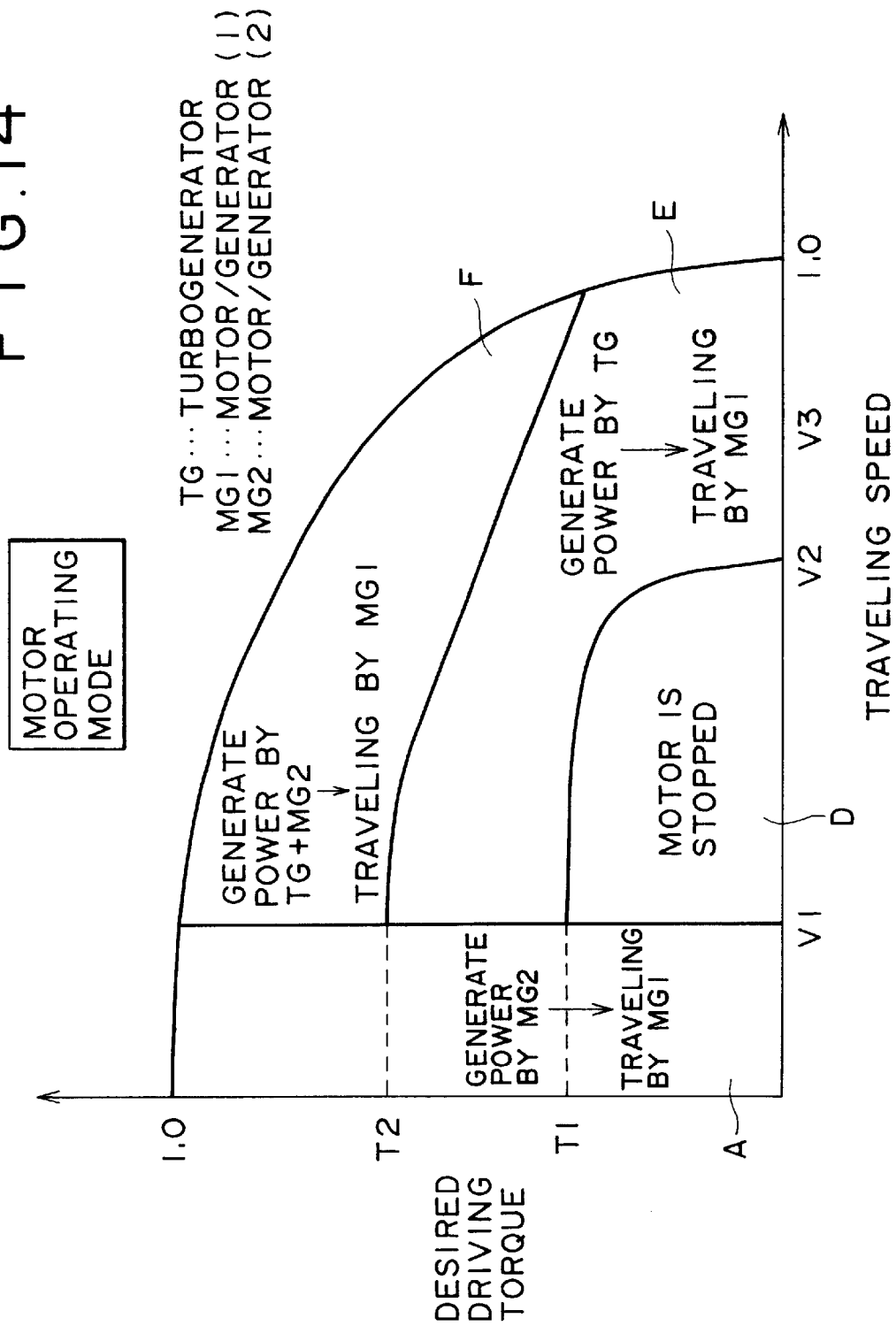

F I G. 15A
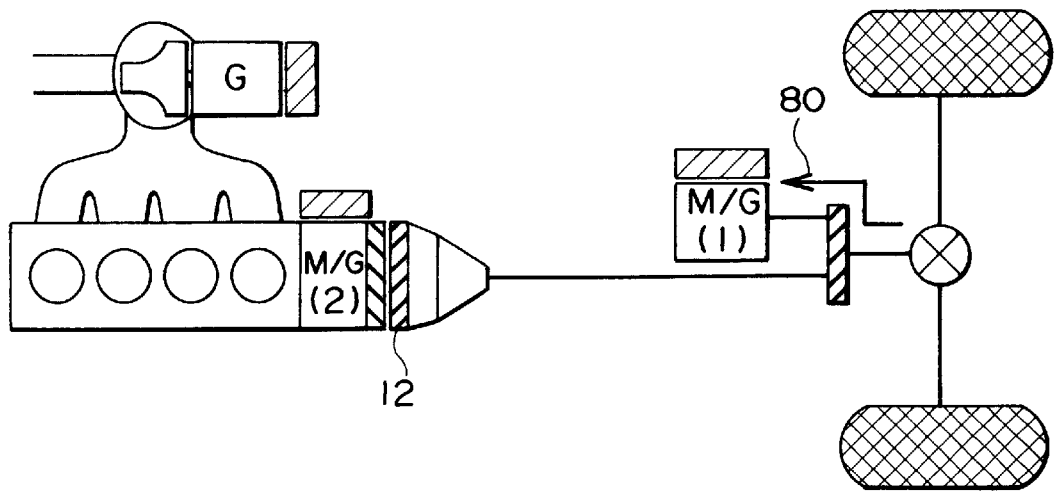
F I G. 15B
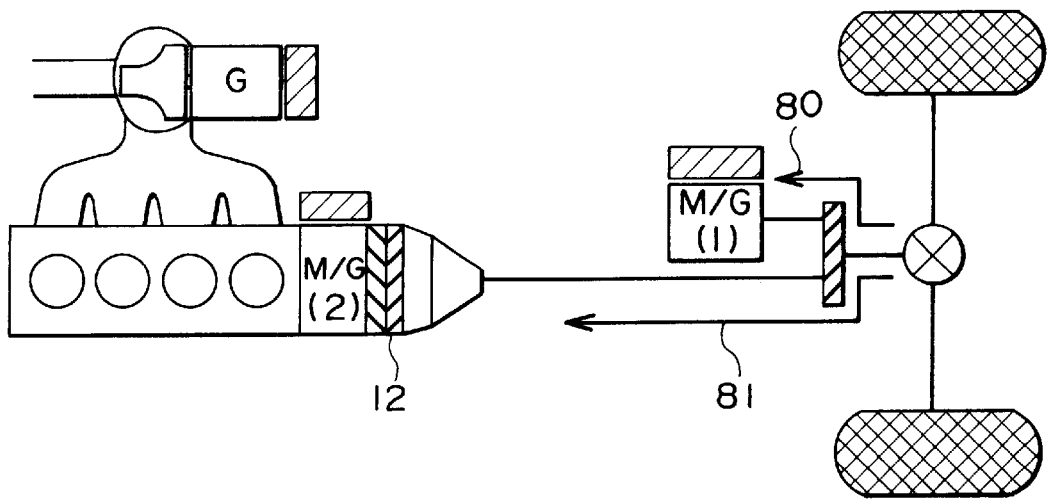

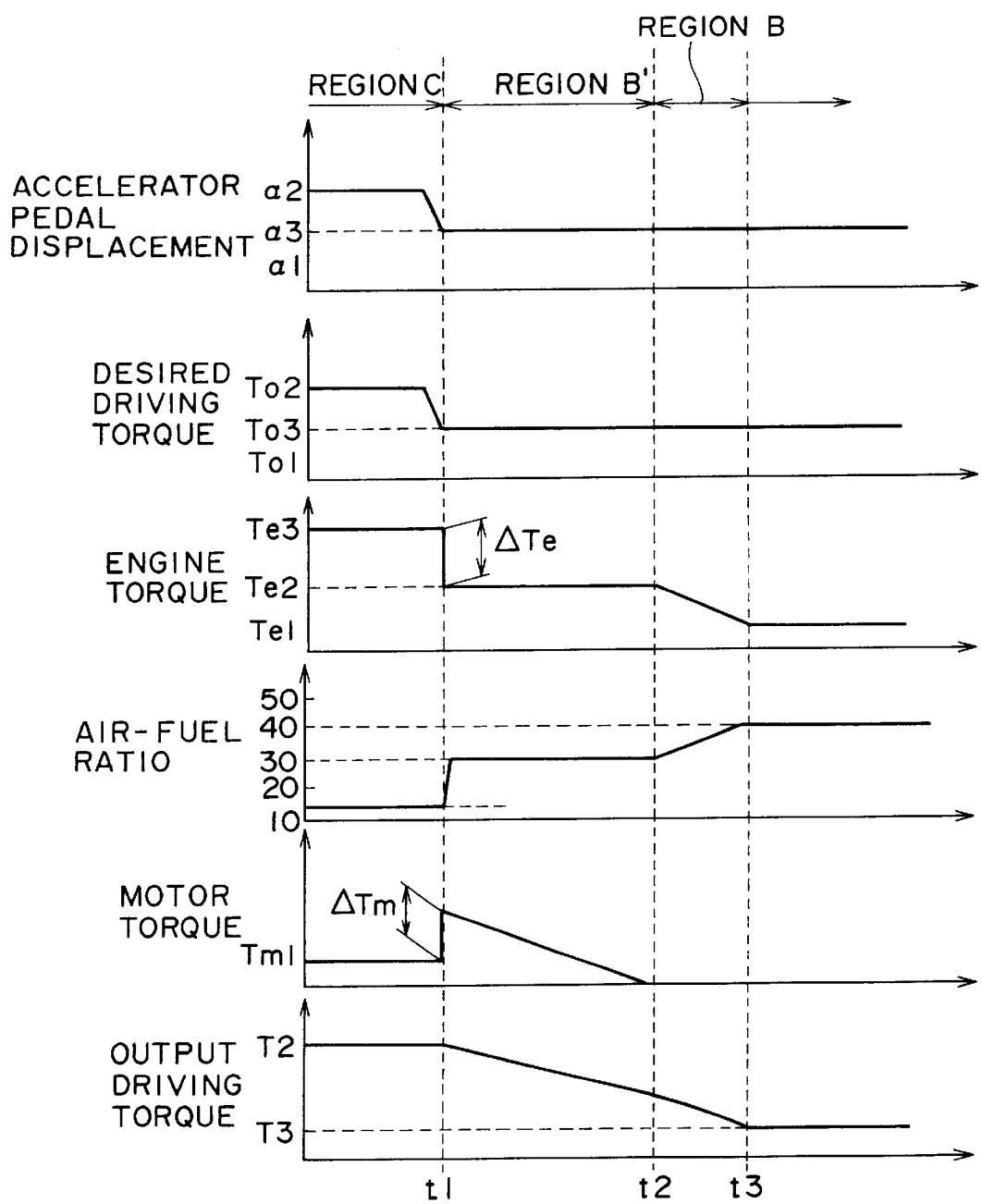

HYBRID VEHICLE DRIVEN BY COMPOSIT TORQUE GENERATED BY AN INTERNAL-COMBUSTION ENGINE AND AN ELECTRIC MOTOR, AND METHOD OF OPERATING SAME

TECHNICAL FIELD

The present invention relates to a hybrid vehicle having a driving system including an internal combustion engine and another power source, a hybrid vehicle driving system, and a method of driving a hybrid vehicle.

BACKGROUND TECHNOLOGY

There have been proposed hybrid vehicles having a driving system including an engine and another power source, such as an electric motor.

Hybrid electric vehicles (hereinafter abbreviated to "HEVs")provided with an engine and an electric motor are classified by the type of a driving system into series HEVs (hereinafter abbreviated to "SHEVs") and parallel HEVs (hereinafter abbreviated to "PHEVs"). In the SHEV, an engine drives a generator to generate electric energy, and a motor is driven by the electric energy to drive wheels. In the PHEV, an engine and a motor are used for driving wheels.

In a vehicle provided with only an engine, the engine is unable to operate efficiently during idling and during low-speed low-load condition, and there is a limit to the reduction of fuel consumption. A vehicle provided with only a motor must be loaded with heavy batteries for storing electricity, have a large vehicle weight and is unable to travel a long distance before the batteries are exhausted.

The HEV compensates those drawbacks in the vehicle provided with only an engine and the vehicle provided with only a motor, and is able to make the most of their advantages. During idling and low-speed low-load condition, in which the engine is unable to operate efficiently, only the motor is used, and changes the power source from the motor to the engine as vehicle speed increases.

The engine is able to operate efficiently and, when an increased torque is required temporarily for acceleration or the like, the output torque of the motor having high response characteristics is used additionally.

A HEV disclosed in Japanese Patent Laid-open No. Hei 8-294205 is provided with a lean-burn engine.

This engine is able to operate in either a stoichiometric mode in which a mixture of a stoichiometric air-fuel ratio is supplied to the engine or a lean-burn mode in which a lean mixture is supplied to the engine. This engine is controlled so as to operate in the lean-burn mode for most part of an operating time to maintain the efficiency of the engine as high as possible.

This prior art HEV, however, supplies electric energy from batteries to the motor, when the torque of the motor is necessary. Therefore, the operating mode of the engine must be changed from the lean-burn mode to the stoichiometric mode when the batteries are charged insufficiently and the engine is unable to operate continuously in the lean-burn mode.

DISCLOSURE OF THE INVENTION

In view of the foregoing problems, it is an object of the present invention to provide a hybrid vehicle driving system capable of making an engine mounted on a HEV operate continuously as long as possible in the lean-burn mode in which the engine is able to operate at a high efficiency.

Even if the batteries are sufficiently charged, the operating mode must be changed from the lean-burn mode to the stoichiometric mode when a high torque is required. There is a transient combustion, range in which a large amount of $NO_x$ is produced between a lean-burn range and a stoichiometric combustion range. If the operating mode of the engine is changed directly from that in the lean-burn range to that in the stoichiometric combustion range to skip an operation in the transient combustion range, the output torque of the engine changes suddenly to produce a torque shock.

To solve such a problem, it is a second object of the present invention to provide a driving method capable of making the most use of the characteristics of the HEV to add the output torque of a motor to the output torque of an engine, of changing the operating mode of the engine from that in the lean-burn range to that in the stoichiometric combustion range without producing $NO_x$ and without producing any torque shocks.

Compression ignition techniques for gasoline engines have made a rapid progress in recent years. However, any compression ignition engine capable of producing torques sufficient for driving a vehicle has not been developed.

Accordingly, it is a third object of the present invention to provide an automobile capable of producing a torque sufficient for driving a vehicle by a compression ignition engine capable of producing a low torque.

The first object of the present invention can be achieved by a hybrid vehicle driving system having a power transmitting means for selectively transmitting the output torque of an electric motor, the output torque of an internal-combustion engine or a composite torque produced by combining the output torques of the internal-combustion engine and the electric motor to driving wheels, comprising a turbogenerator capable of converting the energy of exhaust gas discharged from the internal-combustion engine into electric energy, and an electrical connecting means for electrically connecting the turbogenerator to the electric motor.

The second object of the present invention can be achieved by a hybrid vehicle driving method comprising operating an internal-combustion engine selectively in a first operating mode in which a mixture of an air-fuel ratio not lower than a predetermined first air-fuel ratio is supplied to the internal-combustion engine or a second operating mode in which a mixture of an air-fuel ratio not higher than a predetermined second air-fuel ratio and lower than the first air-fuel ratio is supplied to the internal-combustion engine, and driving wheels by a composite torque produced by combining the respective output torques of the internal-combustion engine and an electric motor, wherein the electric motor is driven and the air-fuel ratio of the mixture supplied to the internal-combustion engine is maintained at the first air-fuel ratio when the air-fuel ratio decreases below the first air-fuel ratio while the internal-combustion engine is operating in the first operating mode.

The second object can be achieved also by estimating a second air-fuel ratio engine torque that may be produced by the internal-combustion engine when a mixture of the second air-fuel ratio would be supplied to the internal-combustion engine, calculating a torque difference between an engine torque that may be produced when a mixture of the first air-fuel ratio is supplied to the engine and the estimated second air-fuel ratio engine torque, and changing the operating mode from the first operating mode to the second operating mode when the output torque of the electric motor is approximately equal to the calculated torque difference.

The third object can be achieved by a hybrid vehicle comprising an internal-combustion engine capable of operating in a compression ignition mode, a generator capable of converting the output energy of the internal-combustion engine into electric energy, and an electric motor capable of converting the electric energy generated by the generator into driving energy for driving wheels.

BRIEF DESCRIPTION OF THE DRAWINGS

FIG. 14 is a diagram of assistance in explaining a motor-drive mode for the hybrid vehicle driving system shown in FIG. 13.

FIGS. 15A and 15B are pictorial views of assistance in explaining power transmitting lines when the hybrid vehicle shown in FIG. 13 operates in a regenerative braking mode.

FIG. 29 is a time chart showing operating condition change (Y→Z) with time.

BEST MODE FOR CARRYING OUT THE INVENTION

Preferred embodiments of the present invention will be described with reference to the accompanying drawings.

Figure 1:
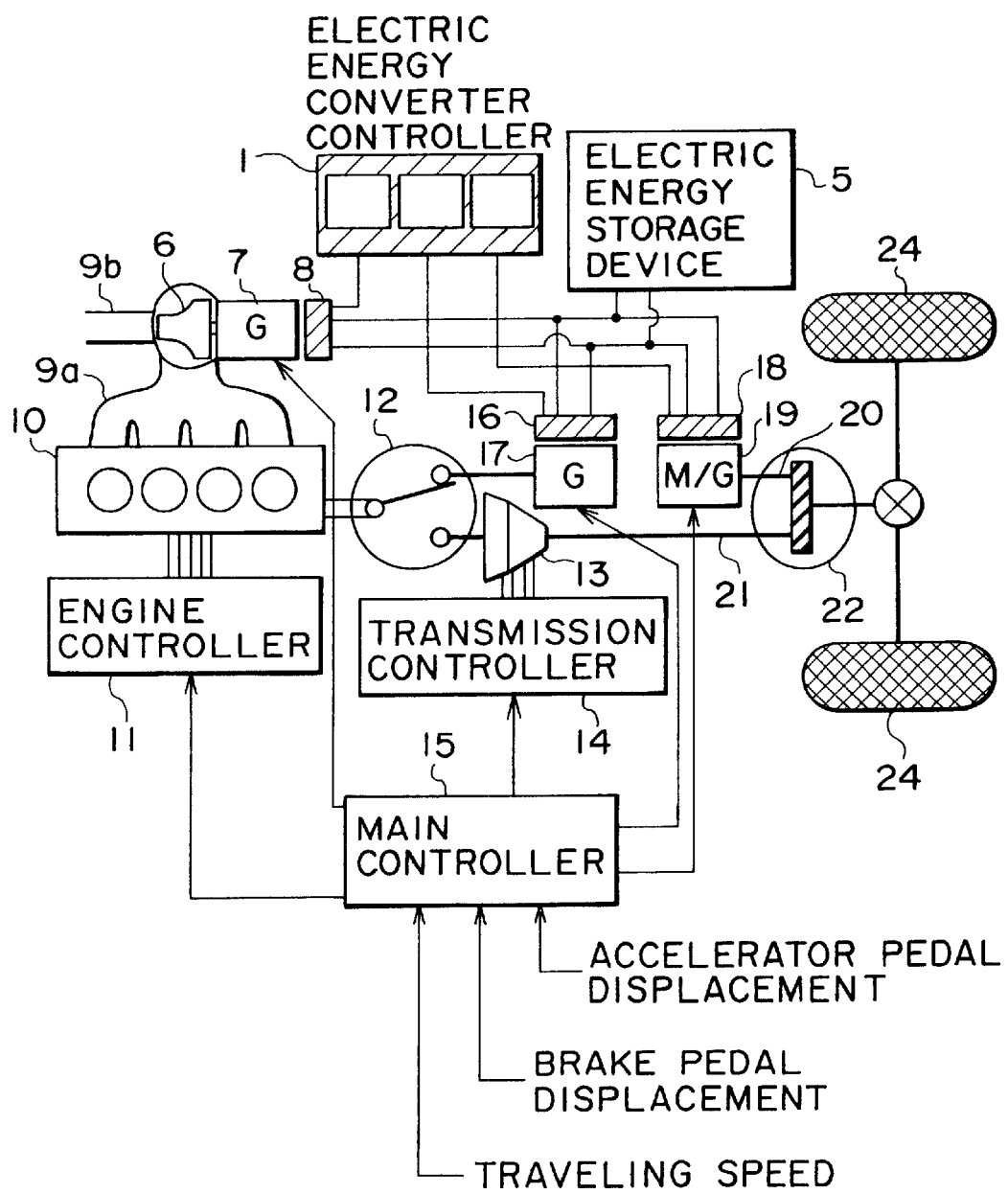
FIG. 1 is a block diagram of a hybrid vehicle driving system in a first embodiment according to the present invention.

FIG. 1 shows a HEV driving system in a first embodiment according to the present invention. The HEV driving system comprises an engine 10, a generator 17 for generating electric energy by an engine torque driven by the engine 10, a motor/generator 19 that receives electric energy and produces a motor torque, and a turbogenerator 7 including a turbine wheel 6 incorporated into an exhaust system 9a, b for the engine 10 to receive the energy of exhaust gas for power generation. The HEV driving system further comprises a power transmission distribution mechanism 12 comprising a planetary gear for distributing the output of the engine 10 to the generator 17 and a drive shaft 21, a power transmission synthesizing mechanism 22 for combining the output of the motor/generator 19 (shaft 20) and the output of the drive shaft 21, an electric energy converter 8 for controlling the voltage of electric energy generated by the turbogenerator 7, an electric energy converter 16 for controlling the voltage of electric energy generated by the generator 17, an electric energy converter 18 for supplying electric energy to the motor/generator 19, an electric energy storage device 5 connected to the electric energy converters to store electric energy, and an electric energy converter controller 1 for controlling the voltages of the electric energy converters and controlling a charging operation for charging the electric energy storage device.

The engine 10 is provided with an electronically controlled throttle valve, not shown, which is fully open while the engine 10 is in a normal operation. A nonthrottle engine not provided with any throttle valve may be used instead of the engine 10. Thus, pump loss, which reduces thermal efficiency, is not produced. The output torque of the engine 10 is controlled through the control of air-fuel ratio, i.e., through the control of fuel supply amount. The engine thus controlled is, for example, a diesel engine. However, a diesel engine is not preferable because a diesel engine produce smoke when the same operates in a high-load operating range. According to the present invention, the engine 10 is assumed to be a lean-burn gasoline engine. Preferably, the engine is a lean-burn engine of a cylinder injection type, in which the fuel is injected directly into a combustion chamber, capable of operating at a high air-fuel ratio of about fifty at a maximum. When the air-fuel ratio is not smaller than fifty, the mixture is ignited for combustion by compression ignition system that ignites a homogeneous mixture by heat of compression. A compression-ignition engine is described in detail in Japanese Patent Laid-open No. Hei 10-56413.

Figure 2:
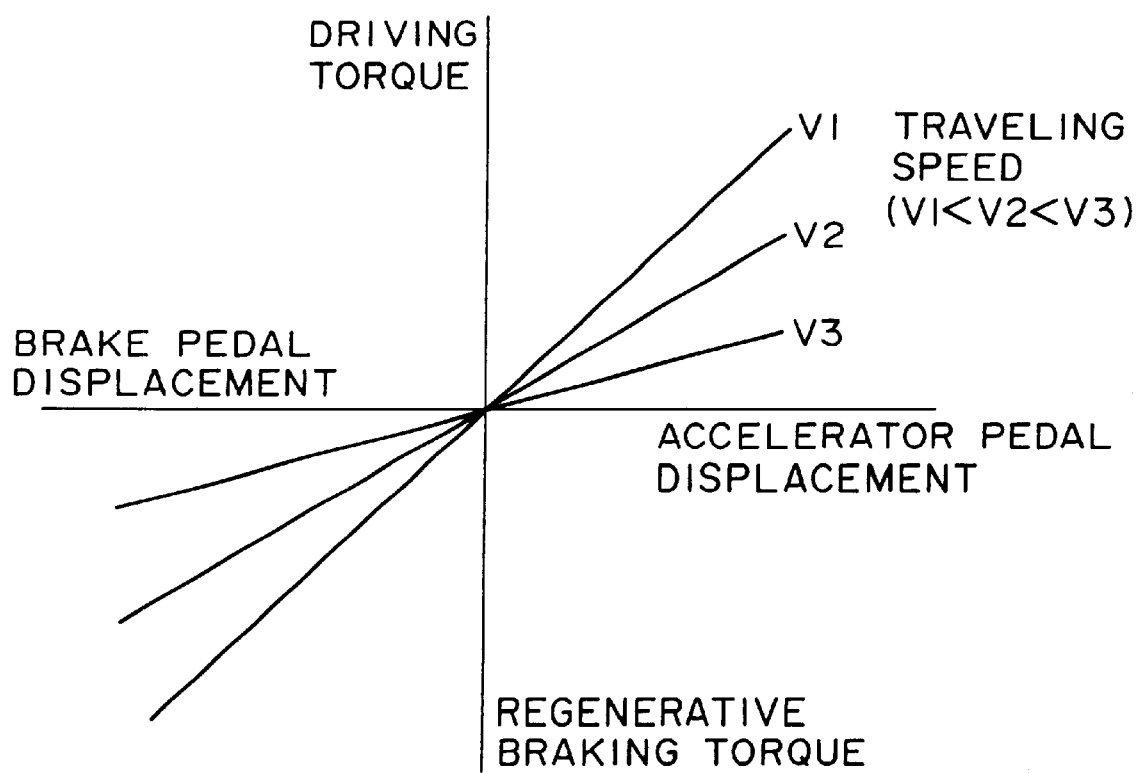
FIG. 2 is a diagram of assistance in explaining a method of determining a desired driving torque for the hybrid vehicle driving system shown in FIG. 1.

The operation of the first embodiment of the present invention will be described hereinafter. FIG. 2 is a diagram of assistance in explaining a method of determining a desired driving torque for a HEV provided with the HEV driving system shown in FIG. 1. The desired driving torque is a torque to be transmitted to a driving wheel 24 to drive the HEV for traveling and is the sum of an engine torque and a motor torque.

A desired driving torque is dependent on accelerator pedal displacement, brake pedal displacement and the traveling speed of the HEV. Accelerator pedal displacement and brake pedal displacement reflect the driver's intention of acceleration and driver's intention of deceleration, respectively, and represent desired output torques, respectively. The desired driving torque increases as the accelerator pedal displacement increases, and the desired torque decreases (regenerative torque increases) as the brake pedal displacement increases. The relation between those factors varies with the traveling speed. The amount of change of the driving torque with the accelerator pedal displacement and that of the driving torque with the brake pedal displacement are small when the traveling speed is high.

Figure 3:
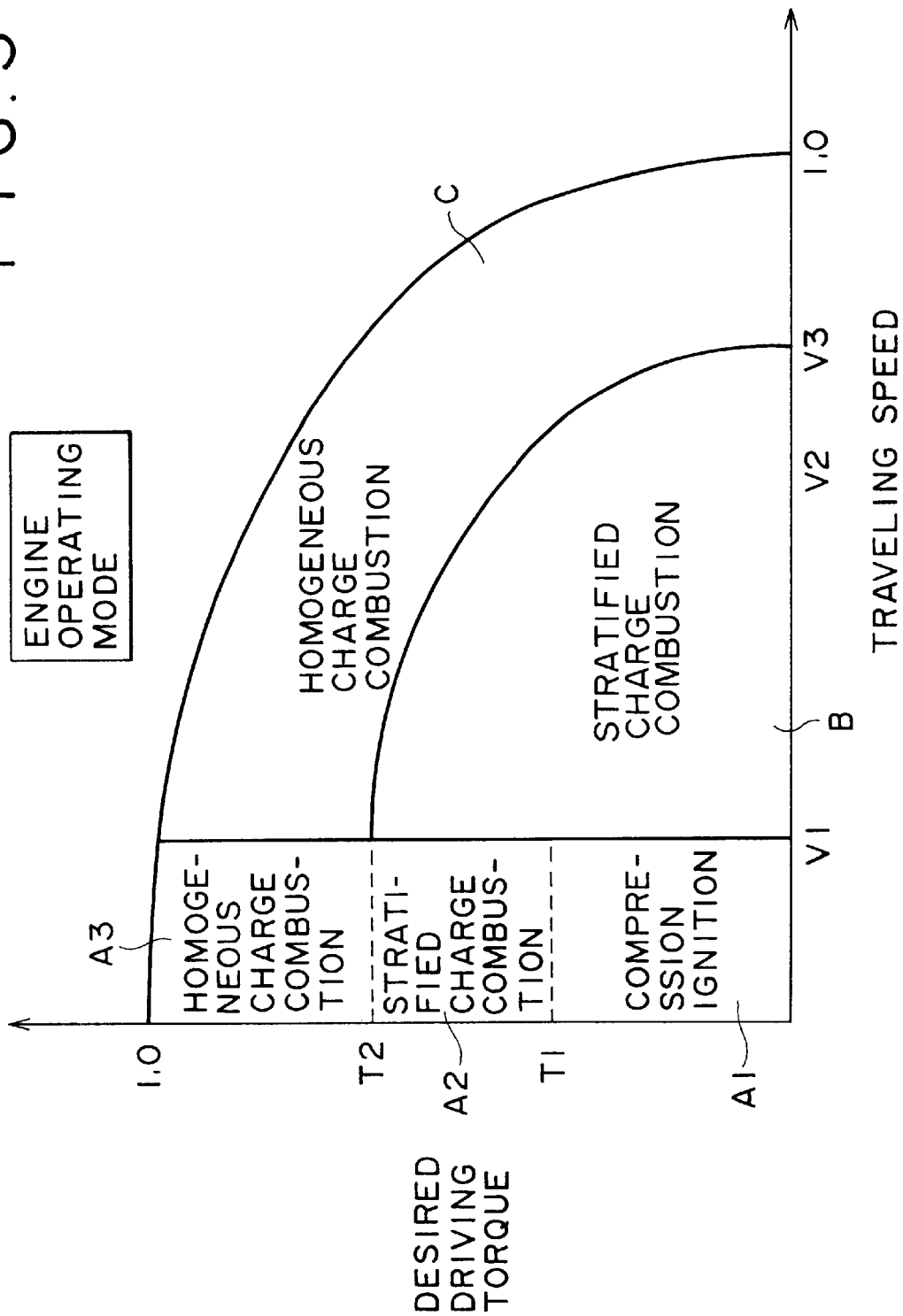
FIG. 3 is a diagram of assistance in explaining an engine operating mode for the hybrid vehicle driving system shown in FIG. 1.

FIG. 3 shows an engine operating mode for the engine of the HEV in this embodiment. The engine operating mode is determined on the basis of traveling speed and desired driving torque. The operating mode is divided roughly into regions A, B and C. Values of traveling speed and desired torque are normalized by maximum values for the HEV in this embodiment. In the region A, the engine is not operated and only the motor 19 is used for traveling until traveling speed reaches a predetermined traveling speed V1 (FIG. 3). If the amount of electric energy stored in the electric energy storage device 5 is insufficient or decreases, the engine 10 is operated in the compression ignition mode to generate power by the generator 17. In this state, the engine speed of the engine 10 is kept constant, the throttle valve is fully opened, and generator driving power is controlled only through the control of fuel feed amount. This control is achieved by controlling power generating amount by an engine controller 11 for controlling the engine 10 on the basis of information provided by a main controller 15. If the desired driving torque is high and the electric energy requirement of the motor/generator 19 is large in the region A, the operating mode is changed to a stratified charge combustion mode (region A2) or a homogeneous charge combustion mode (region A3). A very lean mixture having an air-fuel ratio of 50 or above (superlean mixture) is used for the compression ignition mode, a lean mixture having an air-fuel ratio in the range of 30 to 50 (lean mixture) is used for the stratified charge combustion mode, and a stoichiometric mixture having an air-fuel ration in the range of 14 to 15 (stoichiometric mixture) is used for the homogeneous charge combustion mode.

In a region B, the traveling speed is in the range of V1 and V3, the desired driving torque is not higher than T2, the engine is operated in the stratified charge combustion mode and the air-fuel ratio is in the range of 30 to 50.

In a region C, the air-fuel ratio is stoichiometric, and the engine 10 is operated in the homogeneous charge combustion mode to increase the engine torque.

Figure 4:
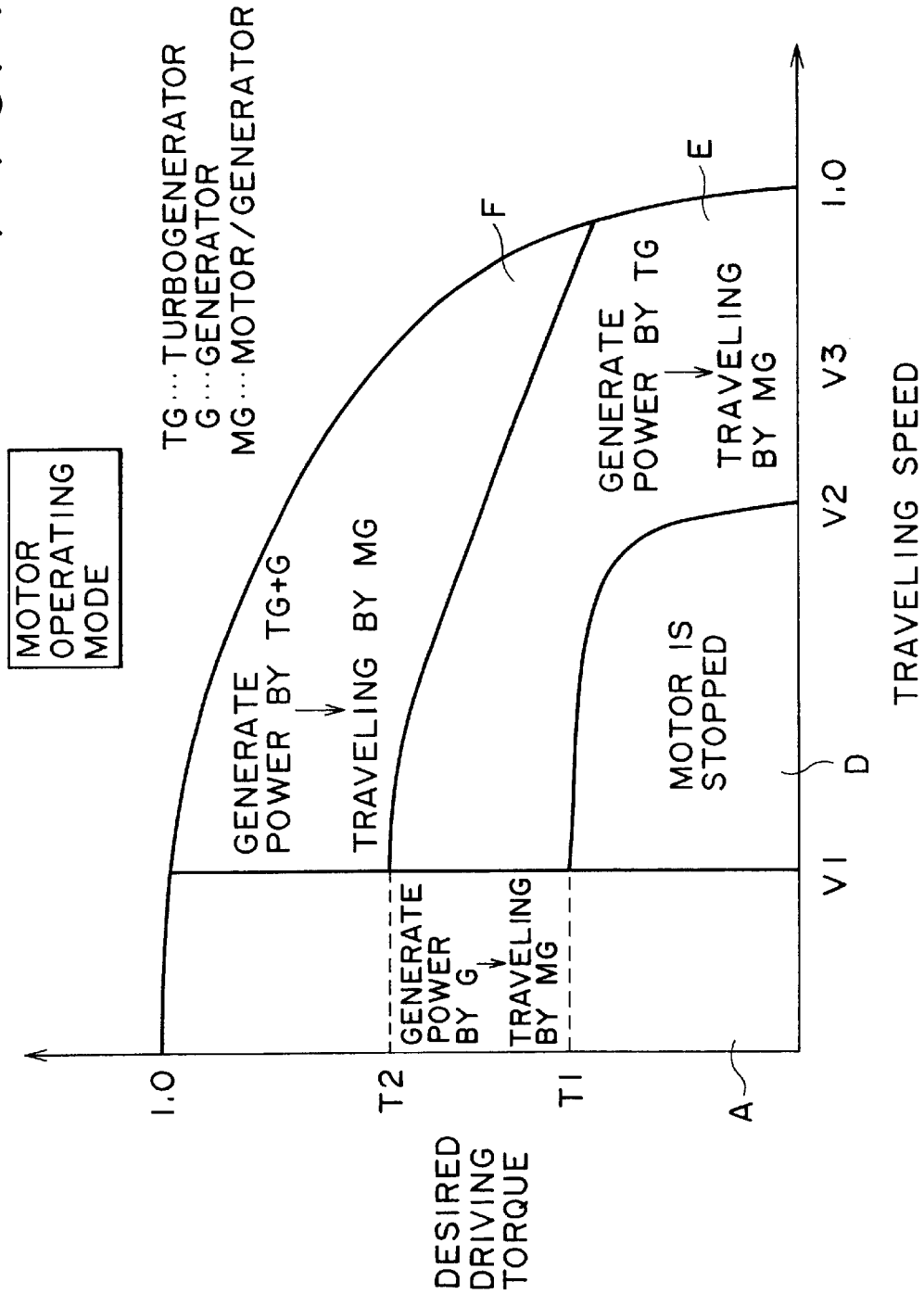
FIG. 4 is a diagram of assistance in explaining a motor operating mode for the hybrid vehicle driving system shown in FIG. 1.

FIG. 4 shows a motor operating mode for the HEV in this embodiment. The motor operating mode is determined on the basis of traveling speed and desired driving torque. The operating mode is divided roughly into regions A, D, E and F. Values of traveling speed and desired torque are normalized by maximum values for the HEV in this embodiment. In the region A, the engine is not operated and only the motor 19 is used for traveling until the traveling speed reaches a predetermined traveling speed V1 (FIG. 4). Electric energy for driving the motor 19 is supplied from the electric energy storage device 5. If the amount of electric energy stores in the electric energy storage device 5 is insufficient or decreases, the engine 10 is operated in the compression ignition mode to generate power by the generator 17 and electric energy thus generated is supplied to the motor 19. This control is achieved by controlling power generating amount by the engine controller 11 for controlling the engine 10 and an electric energy converter controller 1 on the basis of information provided by the main controller 15, which is also connected to transmission controller 14.

In the region D, traveling speed is in the range of V1 to V2, desired driving torque is not higher than T1, only the engine is used for traveling and the motor is not operated.

In the region E, the turbogenerator 7 is driven by the energy of the exhaust gas discharged from the engine 10 to generate electric energy. The electric energy thus generated is used for driving the motor 19 as needed or is used for charging the electric energy storage device 5.

In the region F, the turbogenerator 7 is driven by the energy of the exhaust gas discharged from the engine 10, the generator 17 is driven by the engine 10 to increase power generating amount, and the motor 19 is driven by the thus generated electric energy.

In this embodiment, energy is recovered by the turbogenerator 7 in the regions E and F where engine torque and engine speed are relatively high. As obvious from FIG. 24 which will be described later, the higher the engine torque, the greater is the amount of recovered waste heat.

The conventional automobile recovers energy from exhaust heat produced by the engine by a turbosupercharger and a turbogenerator. Although the turbosupercharger is able to compress intake air, energy recovered by the turbosupercharger cannot be stored. Energy recovered by the turbogenerator can be stored as electric energy in batteries.

Since the hybrid vehicle is provided with a motor that uses electric energy as a driving means, it is preferable that the hybrid vehicle is provided with a turbogenerator, the hybrid vehicle enables inclusive energy management, and the hybrid vehicle operates at improved efficiency.

Figure 5:
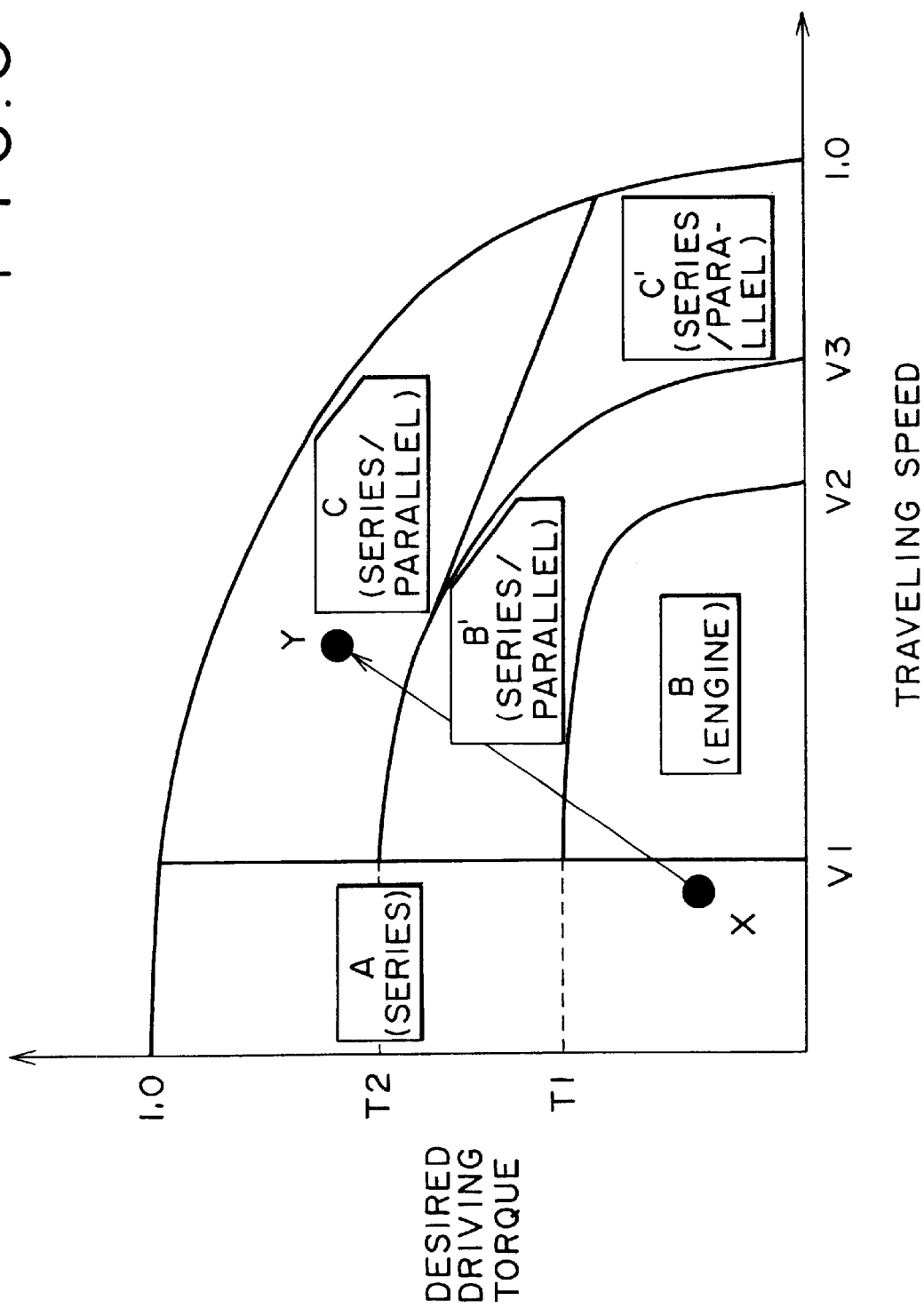
FIG. 5 is a diagram of assistance in explaining series/parallel modes in which the hybrid vehicle driving system shown in FIG. 1 operates.

FIG. 5 shows operating modes for the HEV sorted on the basis of series/parallel conception. Basically, the engine 10 is not operated and only the motor/generator 19 produces driving power in a region A. In this state, the HEV operates as an electric vehicle.

When the electric energy storage device 5 is insufficiently charged or the energy stored in the electric energy storage device 5 decreases, the engine 10 is operated in the compression ignition mode to drive the generator 17, electric energy generated by the generator 17 is supplied to the motor/generator 19. Consequently, the HEV operates as an SHEV when the electric energy is charged.

In a region B, only the engine 10 produces driving power. The HEV operates as an automobile provided with an ordinary internal-combustion engine. A mixture of an air-fuel ratio in the range of 30 to 50 is supplied to the engine 10 to operate the engine 10 in the stratified charge combustion mode. Therefore the efficiency is not reduced. The energy of the exhaust gas is recovered and used by the turbogenerator 7 for power generation.

In a region B', a mixture having an air-fuel ratio of 30 is supplied to the engine 10 for constant operation, and the driving torque is supplemented by the torque of the motor/generator 19. Most part of the electric energy for driving the motor/generator 19 is generated by the turbogenerator 7 and hence the amount of electric energy stored in the electric energy storage device 5 is not affected by the operation of the motor/generator 19. In this respect, the HEV is a PHEV that uses the output torques of both the engine 10 and the motor/generator 19. Since the HEV uses electric energy generated by the turbogenerator 7 for driving the motor/generator 19, the HEV is an SHEV.

In a region C', a mixture having an air-fuel ratio in the range of 14 to 15 is supplied to the engine 10 and the engine 10 operates constantly in the homogeneous charge combustion mode. Driving torque is supplemented with the output torque of the motor/generator 19. Most part of electric energy supplied to the motor/generator 19 is electric energy generated by the turbogenerator 7 and hence the amount of electric energy stored in the electric energy storage device 5 is not affected by the operation of the motor/generator 19. Thus, the HEV operates as both a PHEV and an SHEV as the same operation as the region B'.

In the region C, the generator 17 is operated to increase power generating amount, and electric energy generated by both the turbogenerator 7 and the generator 17 is used. In this region, the HEV operates as a PHEV that uses the output torques of both the engine 10 and the motor/generator 19, and as an SHEV that uses electric energy generated by the turbogenerator 7 for driving the motor/generator 19.

Figure 6:
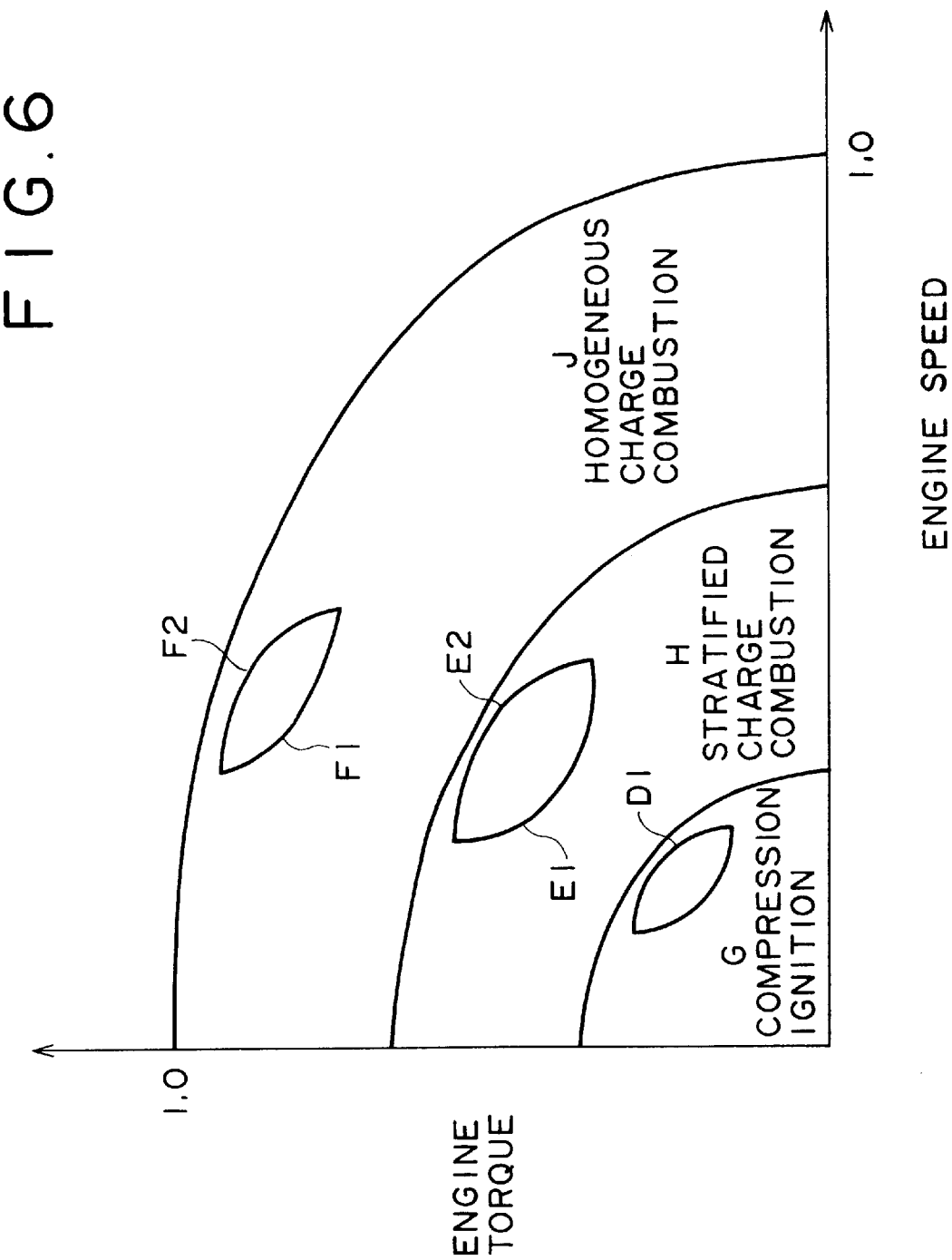
FIG. 6 is a diagram showing regions for the operation of the engine shown in FIG. 1 at a minimum fuel consumption.

FIG. 6 shows characteristics of the engine for the HEV in this embodiment. FIG. 6 shows the dependence of fuel consumption on engine speed and engine torque, and ranges in which the engine operates, at a minimum fuel consumption rate in each operating mode. An ordinary engine the output torque of which is controlled by regulating the amount of air by a throttle valve has a single range in which the engine is able to operate at a minimum fuel consumption rate. The fuel consumption rate of the engine increases in an operating range in which the engine speed and load on the engine are low. The engine in this embodiment for the HEV is able to operate selectively in one of the compression ignition mode, the stratified charge combustion mode and the homogeneous charge combustion mode. Therefore, the engine operates at the minimum fuel consumption rate in three ranges as shown in FIG. 6. In a region G, the engine operates in the compression ignition mode and air-fuel ratio for D1 is about 50. In a region H, the engine operates in the stratified charge combustion mode, air-fuel ratio is about 40 for E1 and about 30 for E2. In a region J, the engine operates in the homogeneous charge combustion mode and air-fuel ratio is about 15 for F1 and about 14 for F2. Air-fuel ratio is thus determined for each operating mode and engine speed is controlled so that fuel consumption rate is in a minimum fuel consumption rate range.

Figure 7:
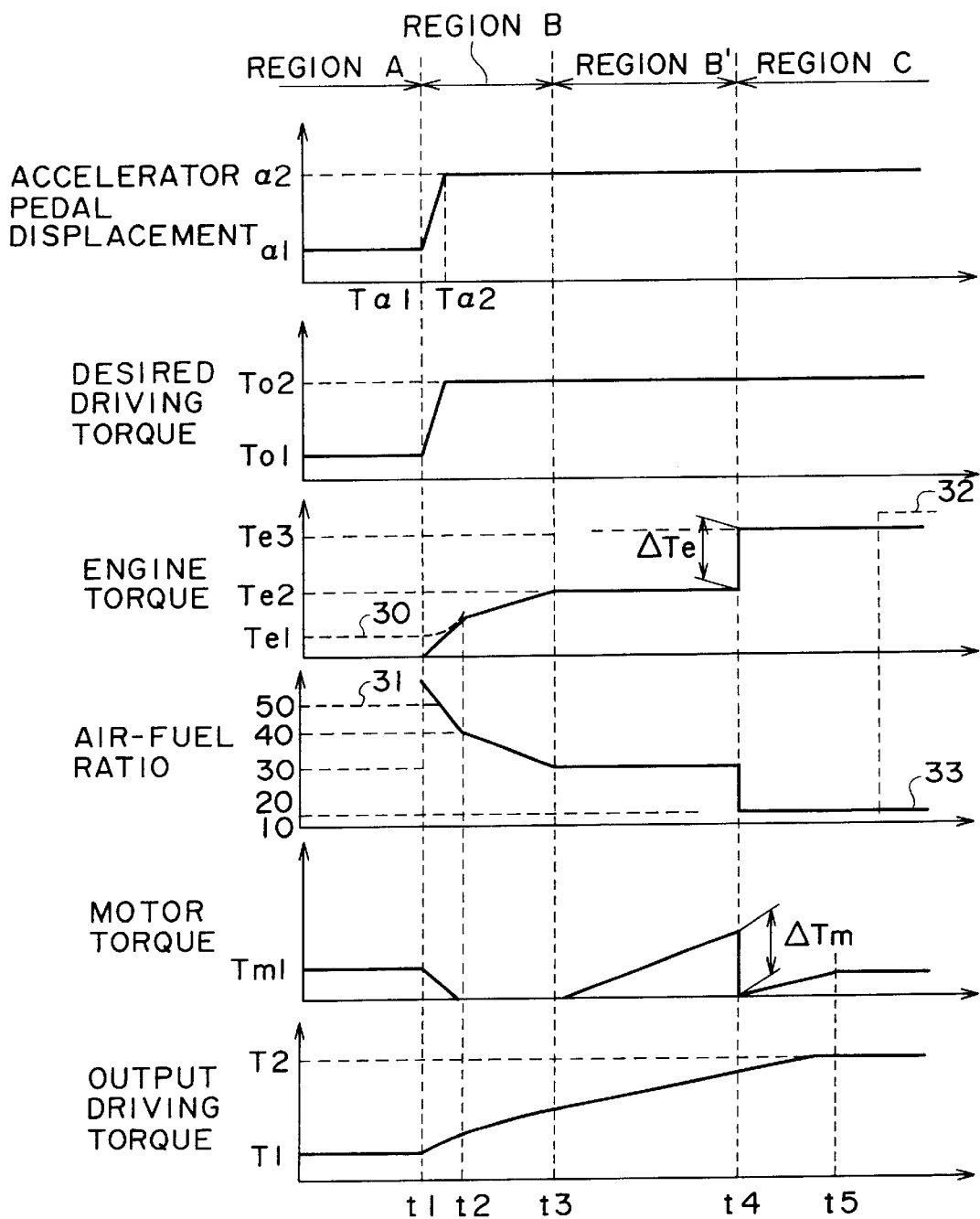
FIG. 7 is a time chart of assistance in explaining the variation of parameters when the operating condition of the hybrid vehicle driving system shown in FIG. 1 changes.

FIG. 7 is a time chart showing control operations of a control system. A characteristic operation of this embodiment will be described on an assumption that operating condition changed from that indicated by a point X to that indicated by a point Y in FIG. 5.

While the HEV is traveling under conditions in the region A, the engine 10 is stopped when the electric energy storage device is fully charged or the engine 10 is operated in the compression ignition mode if the electric energy storage device 5 is insufficiently charged, and an engine torque Te1 indicated by dotted line 30 is produced. The engine torque Te1 is not used directly for driving the vehicle; the same is used to drive the generator 17 for power generation. Therefore, air-fuel ratio is infinity while the engine 10 is stopped and is about 50 as indicated by dotted line 31 while the engine 10 is in operation. In the region A, the vehicle is driven by the motor/generator 19 and the motor produces a torque Tm1. An output torque T1 equal to the torque Tm1 is transmitted to the driving wheel. When the accelerator pedal displacement is changed from α1 to α2, a desired driving torque is calculated on the basis of information about the change of the accelerator pedal displacement and the traveling speed, and the driving toque is changed from To1 to To2. During the change of the desired driving torque from that at the point X to that at the point Y (FIG. 5), the output driving torque changes through those in the regions B and B' to that in the region C. When operating condition changes from that in the region A to that in the region B, air-fuel ratio is determined so that the engine kept stopped or operating to produce the torque Te1 for power generation is operated in the stratified charge combustion mode to produce an engine torque Te2. The torque of the motor/generator 19 is decreased gradually until the air-fuel ratio of the mixture supplied to the engine 10 coincides with a set air-fuel ratio. The output torque of the motor/generator 19 is adjusted by adjusting a current. The motor torque is reduced by reducing the current. In this state, the motor may continue to run by inertia. In the region B, the motor torque is reduced to naught upon the coincidence of the air-fuel ratio of the mixture supplied to the engine 10 with the set value. When the operating condition changes from that in the region B to that in the region B', a mixture having an air-fuel ratio of 30 is supplied to the engine 10, the engine 10 continues to operate at a fixed engine speed in the stratified charge combustion mode to increase the output torque of the motor/generator 19. Thus, the engine 10 is assisted by the motor/generator 19, the engine 10 is able to continue the operation in the stratified charge combustion mode and hence fuel consumption rate can be improved. Since electric energy generated by the turbogenerator 7 is used for driving the motor/generator 19, the amount of electric energy stored in the electric energy storage device 5 does not change. In the region C, the engine 10 operates in the homogeneous charge combustion mode. Consequently, an engine torque Te3 produced by the engine in the homogeneous mixture combustion mode differs from the engine torque Te2 produced by the engine in the stratified charge combustion mode by a torque difference ΔTe. A conventional engine system not provided with any motor-assist mechanism adjusts the output by reducing the flow of air through the throttle valve so as to reduce the torque difference ΔTe, which, however, produces a negative pressure in the cylinders and produces a pump loss.

Figure 8:
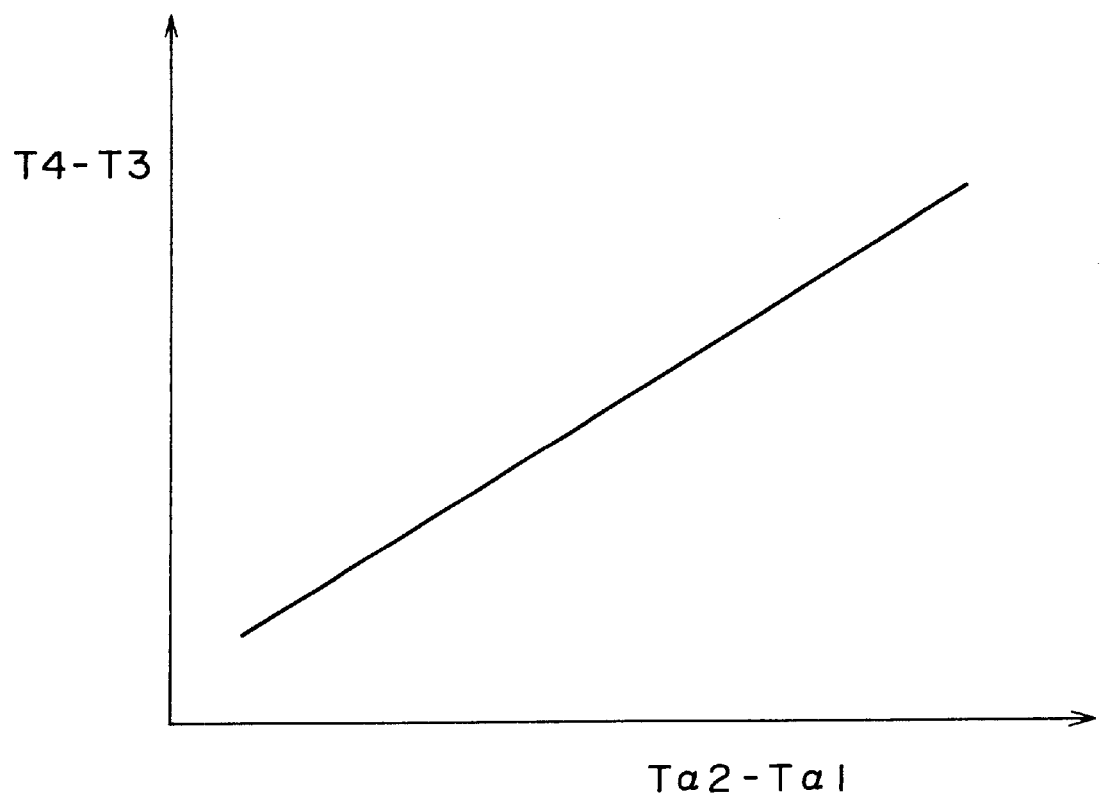
FIG. 8 is a graph showing the response characteristics of the change of condition for the hybrid vehicle driving system shown in FIG. 1.

In this embodiment, the operating condition is changed from that in the region B' to that in the region C when the torque of the assisting motor became approximately equal to the torque difference ΔTe. A control operation for changing the operating condition will be described with reference to FIG. 9. A period where the operating condition is in the region B', time for which the motor/generator 19 is operated for torque assist, is determined on the basis of the accelerator pedal displacement. Since time in which the accelerator pedal displacement changes from α1 to α2 is conceived to be a desired value of output driving torque response time desired by the driver, a short period (Tα2−Tα1) signifies quick acceleration and a relatively long period (Tα2−Tα1) signifies slow acceleration. Therefore, in a period (t4−t3) in the region B' is determined as shown in FIG. 8 according to the period (Tα2−Tα1). When the operating condition is changed to that in the region C, a mixture having an air-fuel ratio of 15 is supplied to the engine 10 and the engine 10 continues to operate at a fixed engine speed in the homogeneous charge combustion mode. The motor torque produced by the motor/generator 19 drops by ΔTe and current command is small immediately after the change of the operating condition. Subsequently, the motor torque of the motor/generator 19 is increased until the desired driving torque is produced. When it is desired to make the generator 17 generate power in the region C, the air-fuel ratio is changed to an air-fuel ratio of 14 as indicated by dotted line to increase the engine torque as indicated by dotted line 32.

Figure 9:
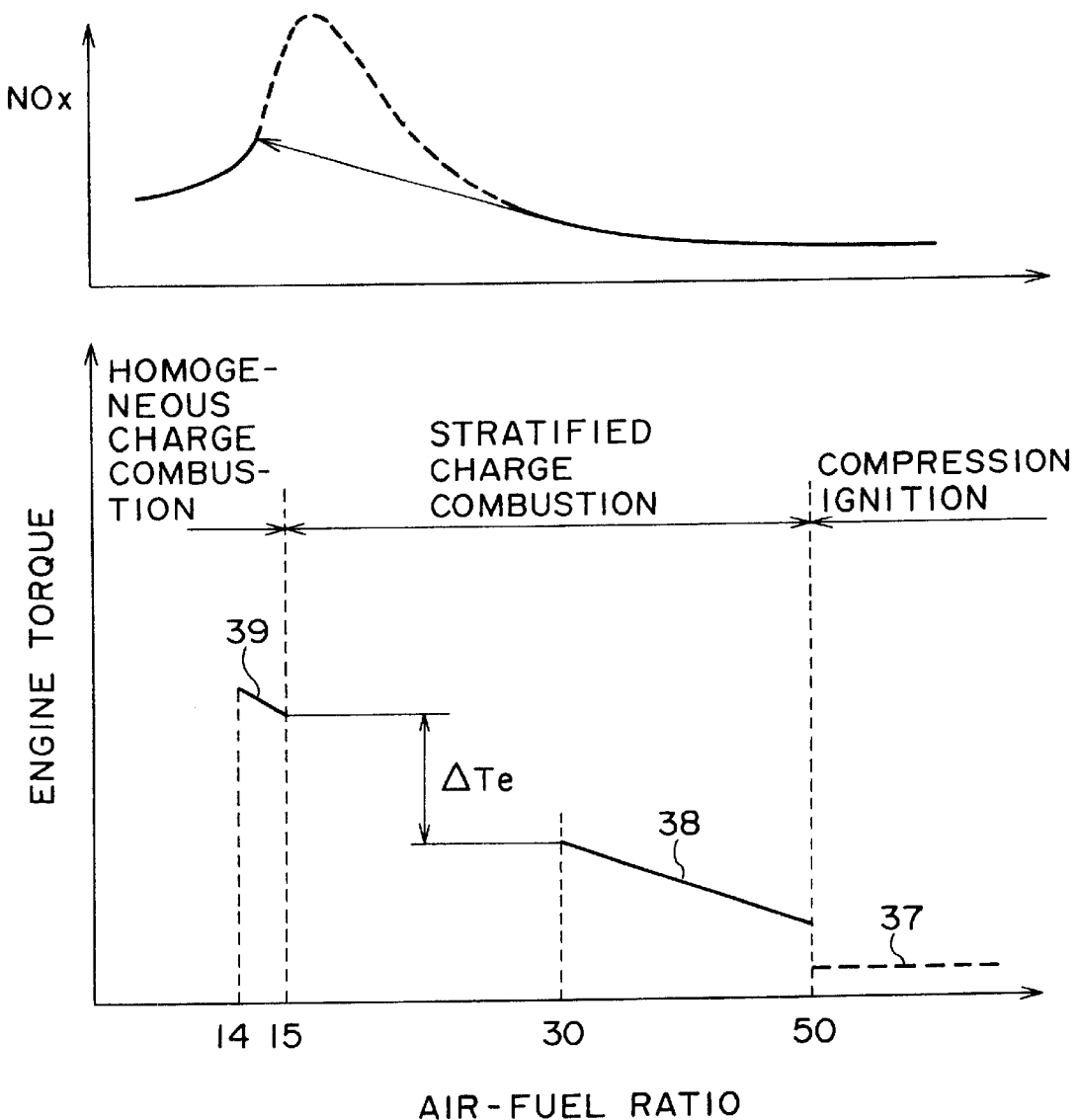
FIG. 9 is a graph showing the relation between engine torque and the amount of discharged $NO_x$ when air-fuel ratio for a hybrid vehicle shown in FIG. 1 is changed.

Control operations for changing the operating condition from that in the region B' to that in region C will be described with reference to FIG. 9. The output characteristic of the engine for the HEV in this embodiment is represented by the relation between air-fuel ratio and engine torque. In a range 37 where air-fuel ratio is 50 or above, the engine is operated in the compression ignition mode in the region A to make the generator 17 generate power. When the generator 17 does not generate any power, the engine torque is naught. A range 38 where air-fuel ratio is in the range of 30 to 50 corresponds to the stratified charge combustion mode, and a range 39 where air-fuel ratio is in the range of 14 to 15 corresponds to the homogeneous charge combustion mode. A range where air-fuel ratio is in the range of 30 to 15 is not used because a large amount of $NO_x$, is produced when the engine is operated in that range.

The engine for the HEV of the present invention is provided with an electronically controlled throttle. However, the flow of air is not varied and fuel supply amount is varied to control engine torque to operate the engine at a high efficiency. Therefore, when air-fuel ratio is changed from 30 to 15, the engine torque changes by a torque change ΔTe.

If air-fuel ratio is thus changed, operating performance becomes worse and it is possible that a driving force transmitting system is broken. The present invention compensates the torque change by the motor torque so that torque is transmitted smoothly to the driving wheel when air-fuel ratio is changed. Since electric energy supplied to the motor/generator 19 in compensating the torque change is generated by the turbogenerator 7 by using energy recovered from the exhaust gas. Therefore, the amount of electric energy stored in the electric energy storage device 5 is not affected by the change of air-fuel ratio. A changing method will more concretely be described. The engine 10 starts operating in a constant operation mode and the motor/generator 19 starts producing motor torque after air-fuel ratio reached 30. Since the motor produces motor torque according to a current command, torque can smoothly be produced by minutely controlling the current command. Consequently, the torque change does not cause any problem. Timing of changing air-fuel ratio from 30 to 15 is determined so that air-fuel ratio is changed when a motor torque ΔTm coincides with the engine torque change ΔTe. Upon the change of air-fuel ratio, the electric energy converter controller 1 reduces the value of the current command given to the motor/generator 19 to reduce the motor torque corresponding to the engine torque change ΔTe. If the changing timing is too late, $$\Delta Tm > \Delta Te \tag{1}$$

and the output driving torque changes stepwise. If the output driving torque drops even for a moment after the change of air-fuel ratio, operating performance and a sensation of acceleration are spoiled. Therefore timing of air-fuel ratio change must be determined so as to meet:

$$\Delta Tm \leq Te \tag{2}$$

Motor torque can accurately be known through the measurement of a current. Engine torque can be estimated from fuel feed amount, intake air supply amount and engine speed. An engine torque when fuel feed amount is increased while a mixture having an air-fuel ratio of 30 is supplied to the engine is estimated. If an estimated engine torque is excessively high, the motor/generator controls ΔTm on the basis of a wrong ΔTe' different from the actual engine torque change ΔTe and a state represented by Expression (1) may occur. Therefore, the relation between the estimated engine torque change ΔTe' and the motor torque ΔTm is expressed by:

$$\Delta Tm = \beta \times \Delta Te' \tag{3}$$

and the value of β is adjusted so that the estimated engine torque change ΔTe' approaches the actual engine torque change ΔTe.

Figure 10:
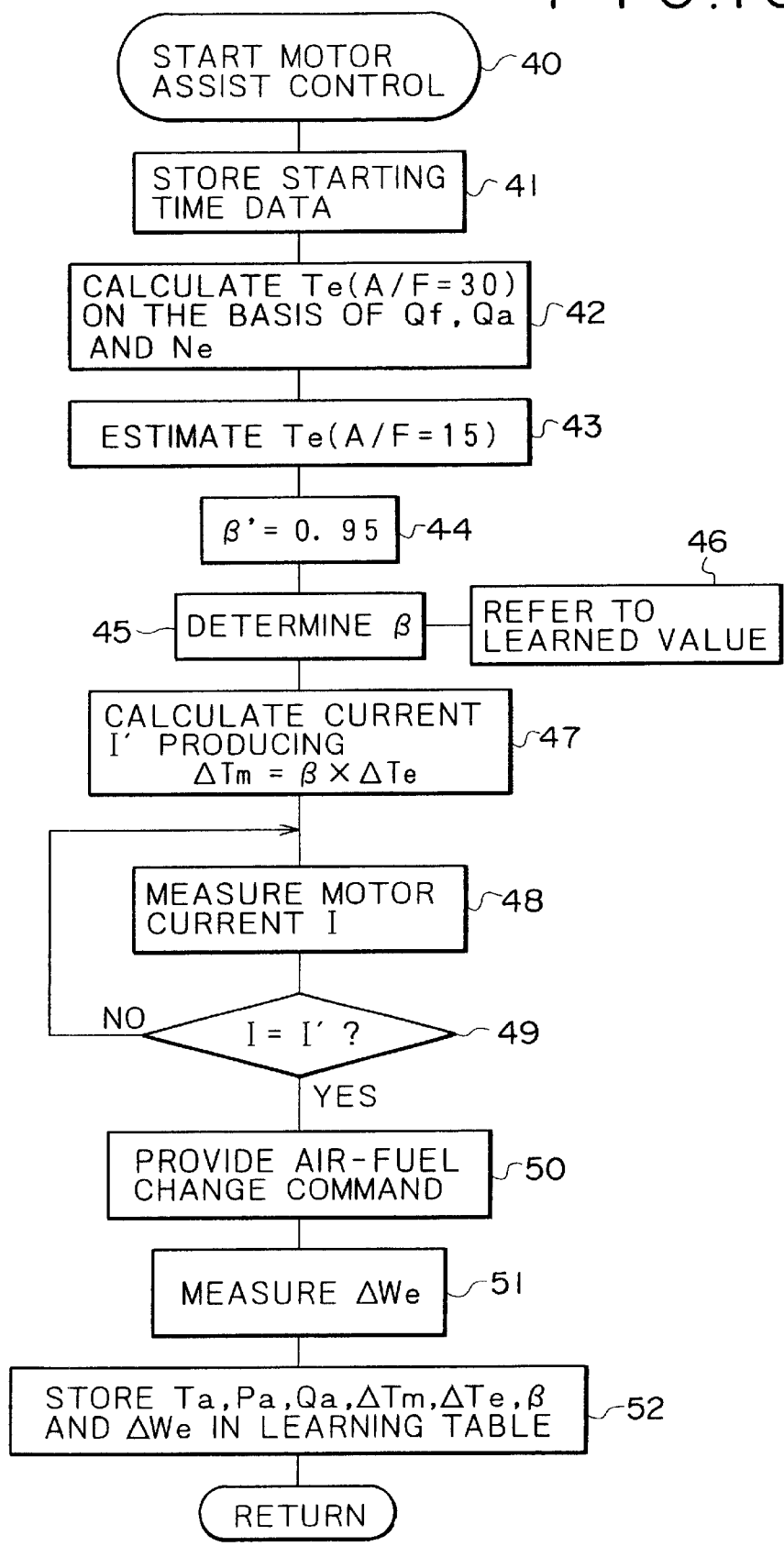
FIG. 10 is flow chart of a motor-assistance control procedure to be carried out when changing air-fuel ratio by the hybrid vehicle driving system shown in FIG. 1.

FIG. 10 shows a control procedure to be carried out when changing the air-fuel ratio. When a motor-assisted operation control operation is started in block 40, the main controller 15 stores time data indicating the time when the motor-assisted operation control operation is started in a storage device included in a control unit in block 41. In block 42, engine torque at present (air-fuel ratio: 30) is calculated on the basis of fuel feed amount, intake air supply amount and engine speed. In block 43, engine torque when air-fuel ratio is 15 is estimated on the basis of the calculated result. At the beginning of the first cycle of the air-fuel ratio change control operation, the correction coefficient β for correcting an estimated engine torque is given in block 44. When learned value of the correction coefficient β is stored in the storage device included in the control unit, reference is made to the learned value of the correction coefficient β in block 46 and the value of the correction coefficient β is determined in block 45. The motor torque change ΔTm is calculated by using Expression (3) in block 47, and a current I' that produces the motor torque change ΔTm is calculated. In block 48, motor current I is measured, and the motor current I is compared with the motor current I' in block 49. If the motor current I and I' are different from each other, the motor current I is measured again in block 48 and is compared with the motor current I' in block 49. When I=I', an air-fuel ratio change command 50 requesting changing air-fuel ratio from 30 to 15 is given to the controller 11 of the engine 10. In block 51, change in the driving wheel is measured to decide whether or not the correction coefficient A for correcting the estimated engine torque is appropriate. The change in the rotation of the driving wheel is measured by a torque sensor attached to a propeller shaft or a wheel speed sensor included in an antilock brake system (ABS). Since a torque sensor measures an actual torque being transmitted to the driving wheel, it can be decided that the output driving torque has smoothly changed. A wheel speed sensor measures a change in rotating speed when the output driving torque changes stepwise. Change in the output driving torque can be measured by either a torque sensor or a wheel speed sensor. In block 52, a set of data including a change in the output driving torque, a fuel feed amount, an intake air supply amount, an engine speed, an estimated engine torque difference and a motor torque is stored in the storage device for learning control. Therefore, the accuracy of the correction coefficient β is improved by leaning control. After the completion of the motor-assisted air-fuel ratio change control operation, the control procedure returns to a main control procedure.

Figure 11A:
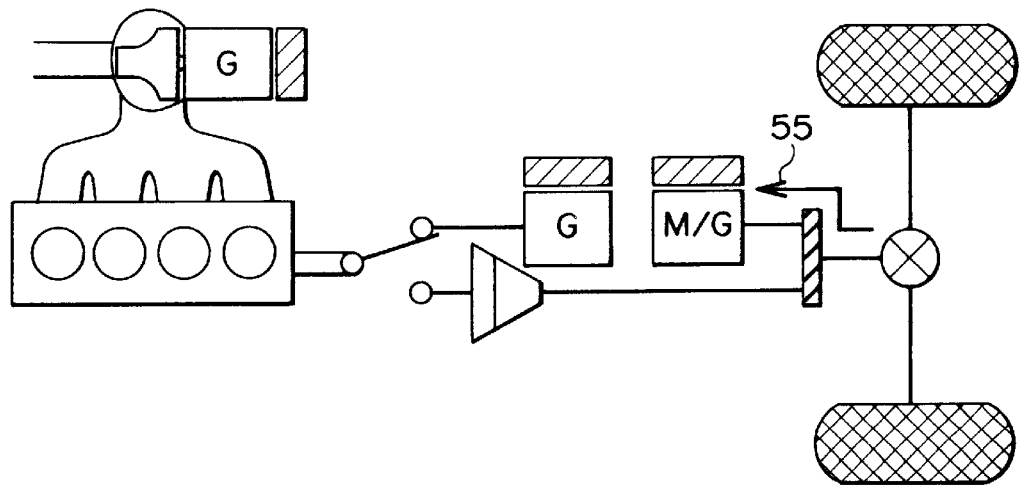
FIGS. 11A and 11B are pictorial views of assistance in explaining power transmitting lines when the hybrid vehicle shown in FIG. 1 operates in a regenerative braking mode.
Figure 11B:
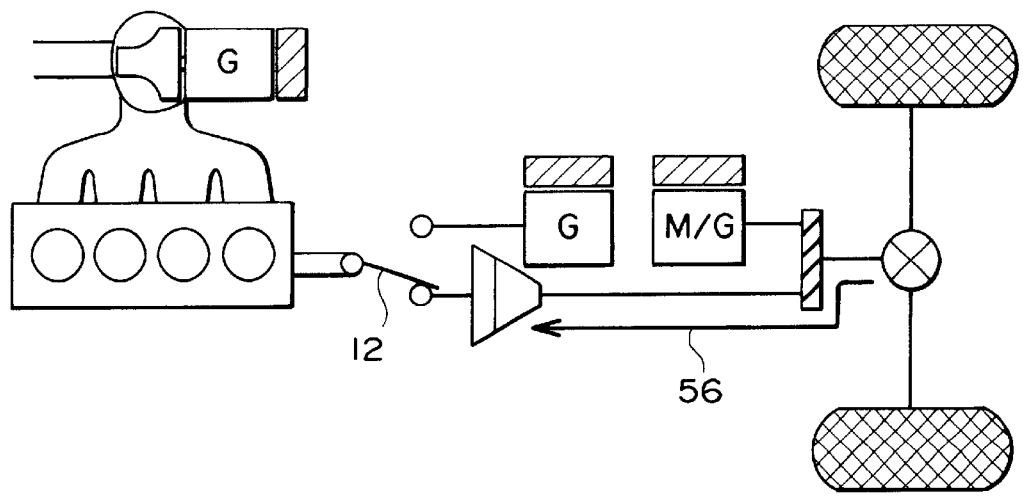

FIGS. 11A and 11B show the condition of power transmitting lines when the brake system of the HEV is operated. In the HEV, a braking force proportional to the brake pedal displacement is produced as shown in FIG. 2. In this specification, the braking force is equal to the sum of a braking force produced by a mechanical brake system of the vehicle, a regenerative braking force (arrow 55) produced by the motor/generator 19 and an engine-braking force. As shown in FIG. 11A, rotational energy of a mechanism on the side of the wheels is used to drive the motor/generator 19 for regenerative braking when the electric energy storage device 5 has empty capacity (when the electric energy storage device 5 is not fully charged). As shown in FIG. 11B, rotational energy (arrow 56) of the mechanism on the side of the wheels is used to drive the engine when the electric energy storage device has a little empty capacity (when the electric energy storage device 5 is fully charged). In this state, the electronically controlled throttle is fully closed to produce negative pressures in the cylinders of the engine in order that the braking effect of the engine is enhanced.

Figure 12:
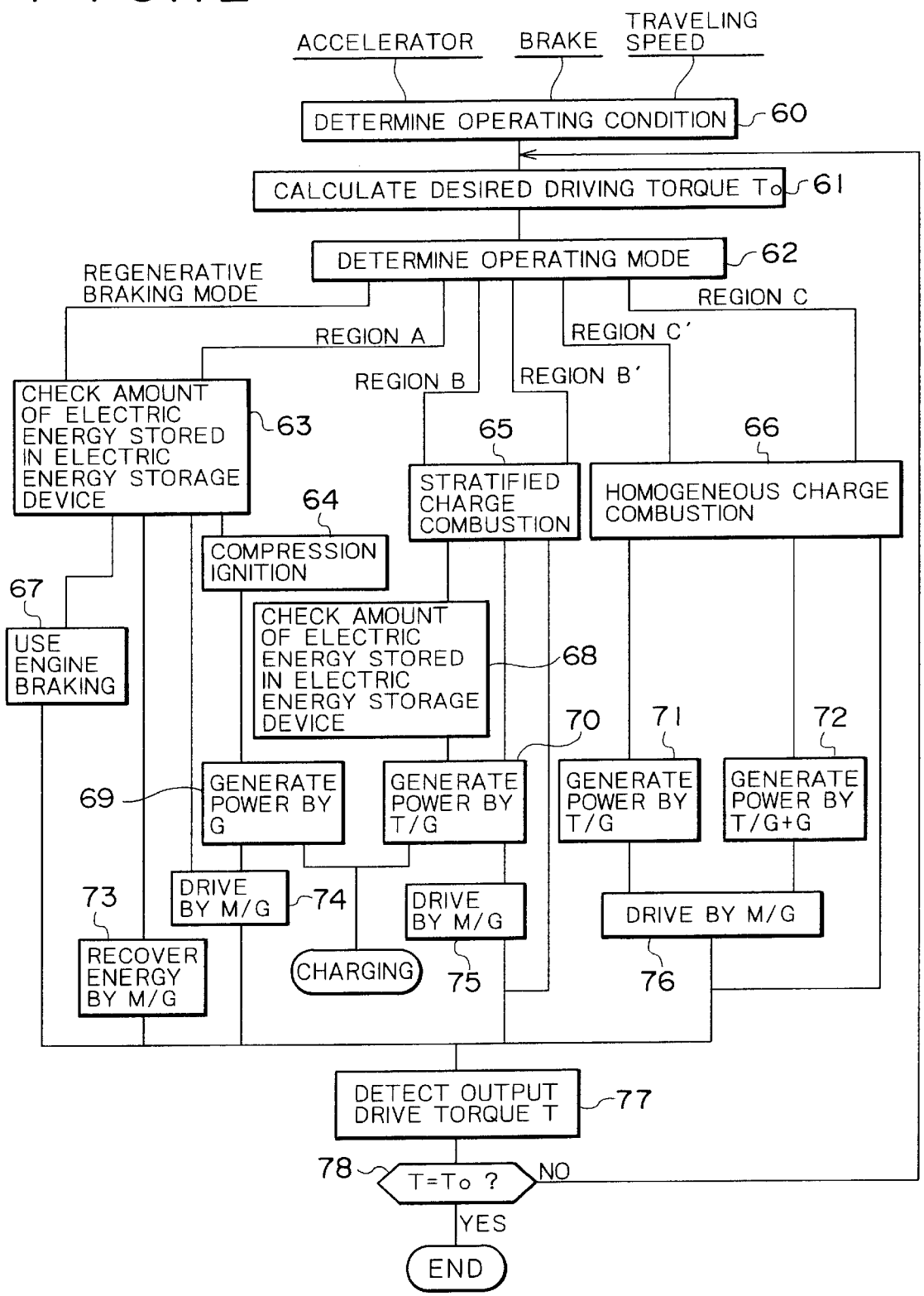
FIG. 12 is a flow chart of a control procedure to be carried out for controlling the hybrid vehicle shown in FIG. 1.

FIG. 12 shows a control procedure in this embodiment. In block 60, an operating condition of the HEV is determined on the basis of a set of data including an accelerator pedal displacement, a brake pedal displacement and a traveling speed, and a desired driving torque is calculated in block 61. In block 62, an operating mode is determined on the basis of the desired driving torque and the traveling speed. In the region A, the amount of electric energy stored in the electric energy storage device 5 is checked in block 63. If the electric energy storage device 5 is insufficiently charged, the engine 10 is operated in the compression ignition mode in block 64 to generate power by the generator in block 69. If the electric energy storage device 5 is fully charged, the engine 10 is stopped. When the engine 10 is operated, the electric energy converter controller 1 gives a voltage control signal to the electric energy converter 16 of the generator 17. Since the generator 17 is assumed to be an ac generator, the electric energy converter 16 is an ac-dc converter for converting ac electric energy generated by the generator 17 into corresponding dc electric energy. If the generator 17 is a dc generator, the electric energy converter 16 is a dc-dc converter, and the controller 1 executes a voltage changing control operation to change a voltage to a predetermined voltage. As shown in block 74, the motor/generator 19 produces a driving force for traveling in the region A.

In the region B, the engine 10 is operated in the stratified charge combustion mode in block 65 and the motor/generator 19 does not produce any driving force. In block 68, the amount of electric energy stored in the electric energy storage device 5 is checked. If the electric energy storage device 5 is insufficiently charged, power is generated (block 70) by the turbogenerator 7 combined with the exhaust pipe 9 of the engine 10 to charge the electric energy storage device 5. The region B has a special region B' for special conditions, i.e., transient conditions under which the engine 10 is operated when the operating condition of the engine changes from that in the region B to that in the region C. In the region B', the engine 10 operates constantly in the stratified charge combustion mode and the motor/generator 19 is driven (block 75) to assist the engine 10 for providing a desired torque.

In the region C, the engine 10 is operated in the homogeneous charge combustion mode in block 66, the motor/generator 19 is driven in block 76 to provide an supplementary torque. Electric energy is supplied to the motor/generator 19 only by the turbogenerator 7 (block 71) in the region C', and by both the turbogenerator 7 and the generator 17 (block 72) in the region C.

Basically, the motor/generator 19 recovers energy in block 73 when the brake system is operated. When it is confirmed in block 63 that the electric energy storage device 5 is fully charged, the motor/generator 19 is not used for regenerative braking operation and the braking effect of the engine 10 is used in block 67. In any one of those modes, the output driving torque T is measured in block 77 and the foregoing operations are repeated until the output driving torque T coincides with the desired driving torque To (block 78).

Figure 13:
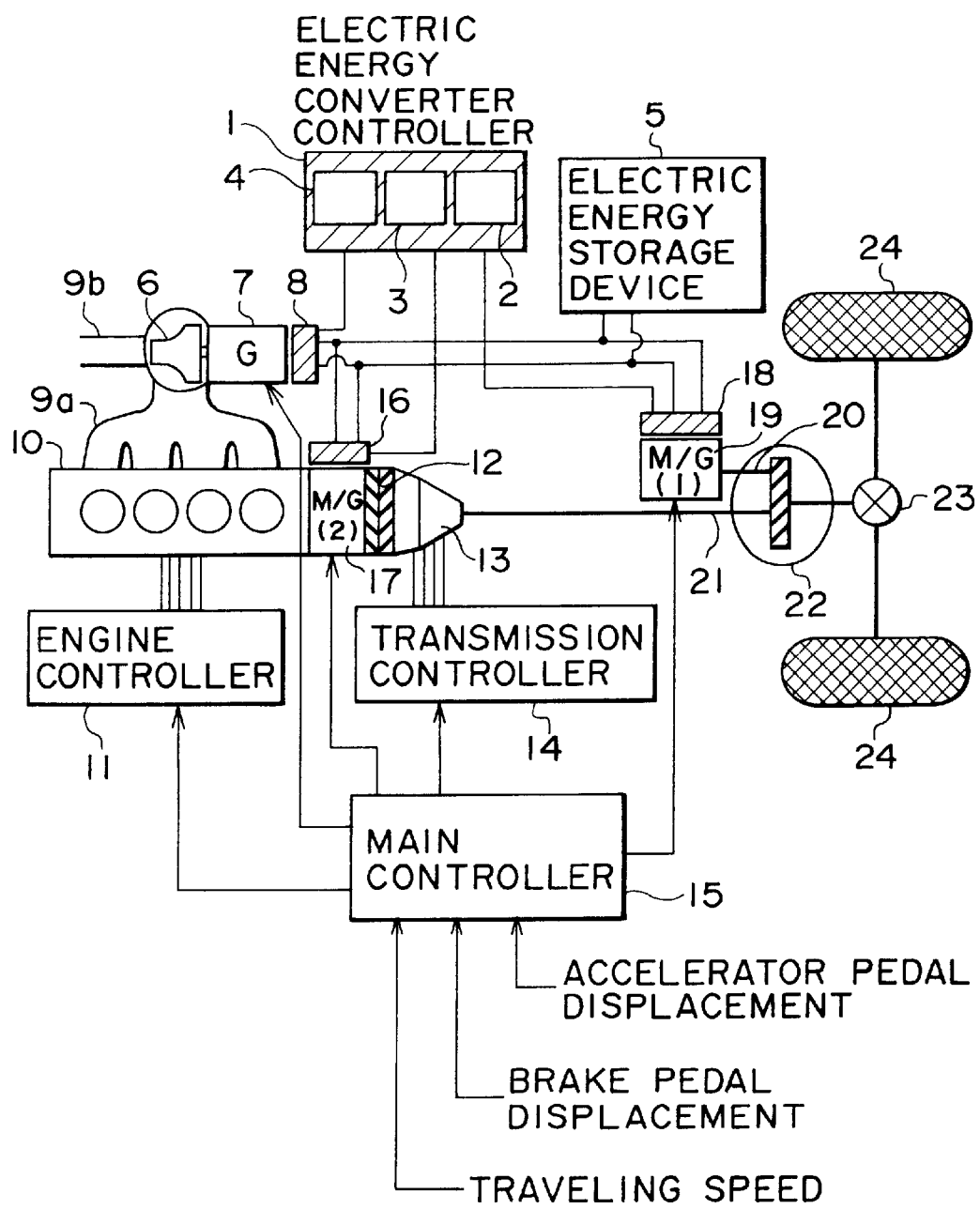
FIG. 13 is a block diagram of a hybrid vehicle driving system in a second embodiment according to the present invention.

Another embodiment of the present invention will be described. FIG. 13 shows an HEV driving system in a second embodiment according to the present invention. The HEV driving system comprises an engine 10, a motor/generator 17 interposed between the engine 10 and a clutch 12, a motor/generator 19 independent of the engine 10, and a turbogenerator 7 combined with the exhaust system 9 of the engine 10 to generate power by using the energy of the exhaust gas. The HEV driving system further comprises a power transmission change mechanism 22 for combining the output of the motor/generator 19 and the output of the engine 10 transmitted by a drive shaft 21, an electric energy converter 8 for controlling the voltage of electric energy generated by the turbogenerator 7, an electric energy converter 16 for controlling the voltage of electric energy generated by the motor/generator 17, an electric energy converter 18 for supplying electric energy to the motor/generator 19, an electric energy storage device 5 connected to the electric energy converters to store electric energy, and an electric energy converter controller 1 for controlling the voltages of the electric energy converters and controlling a charging operation for charging the electric energy storage device. Desirably, the engine is similar to that included in the first embodiment.

The operation of the second embodiment will concretely be described hereinafter. A method of determining a desired driving torque for an HEV driven by the HEV driving system shown in FIG. 3 is the same as that previously explained with reference to FIG. 2. Engine operating modes and series/parallel modes for the engine of the HEV in this embodiment are the same as those previously described with reference to FIGS. 3 and 5. FIG. 14 shows a motor operating modes. The motor operating mode is determined on the basis of traveling speed and desired driving torque. The motor operating mode is divided roughly into regions A, D, E and F. Values of traveling speed and desired driving torque are normalized by maximum values for the HEV in this embodiment. In the region A, the engine is not operated and only the motor 19 is used for traveling until traveling speed reaches a predetermined traveling speed V1 (FIG. 14). The electric energy storage device 5 supplies electric energy for driving the motor 19. If the amount of electric energy stored in the electric energy storage device 5 is insufficient or decreases, the engine 10 is operated in the compression ignition mode to generate power by the generator 17 and electric energy generated by the generator 17 is used for driving the motor 19. This control is achieved by controlling power generating rate by an engine controller 11 for controlling the engine 10 and the electric energy converter controller 1 on the basis of information provided by a main controller 15.

In the region D, where traveling speed is in the range of V1 to V2, and desired driving torque is not higher than T1, only the engine is used for traveling and the motor is not operated.

In the region E, the turbogenerator 7 is driven by the energy of the exhaust gas discharged from the engine 10, electric energy generated by the turbogenerator 7 is used for driving the motor 19 or for charging the electric energy storage device 5.

In the region F, the turbogenerator 7 is driven by the energy of the exhaust gas discharged from the engine 10, the motor/generator 17 is driven by the engine 10 to increase power generating amount and electric energy generated by the turbogenerator 7 and the motor generator 17 is used for driving the motor 19.

FIGS. 15A and 15B show the condition of power transmitting lines when the brake system of the HEV is operated. In the HEV, a braking force proportional to the brake pedal displacement is produced as shown in FIG. 2. In this specification, the braking force is equal to the sum of a braking force produced by a mechanical brake system of the vehicle, a regenerative braking force produced by the motor/generators 17 and 19, and an engine braking force. As shown in FIG. 15A, rotational energy of a mechanism on the side of the wheels (arrow 80) is used to drive the motor/generator 19 for regenerative braking when the electric energy storage device 5 has empty capacity (when the electric energy storage device 5 is not fully charged). As shown in FIG. 15B, rotational energy of the mechanism on the side of the wheels (arrow 81) is transmitted through a power transmission changing mechanism, a transmission and a clutch to the motor/generator 17 and is used to increase the regenerative braking force when the electric energy storage device has little empty capacity. In FIG. 15B, the energy of the mechanism on the side of the wheels is not transmitted to the two motor/generators 17 and 19 and is transmitted to the engine 10 when the electric energy storage device 5 has little empty capacity (when the electric energy storage device 5 is fully charged). In this state, the electronically controlled throttle is fully closed to produce negative pressures in the cylinders of the engine in order that the braking effect of the engine is enhanced.

Figure 16:
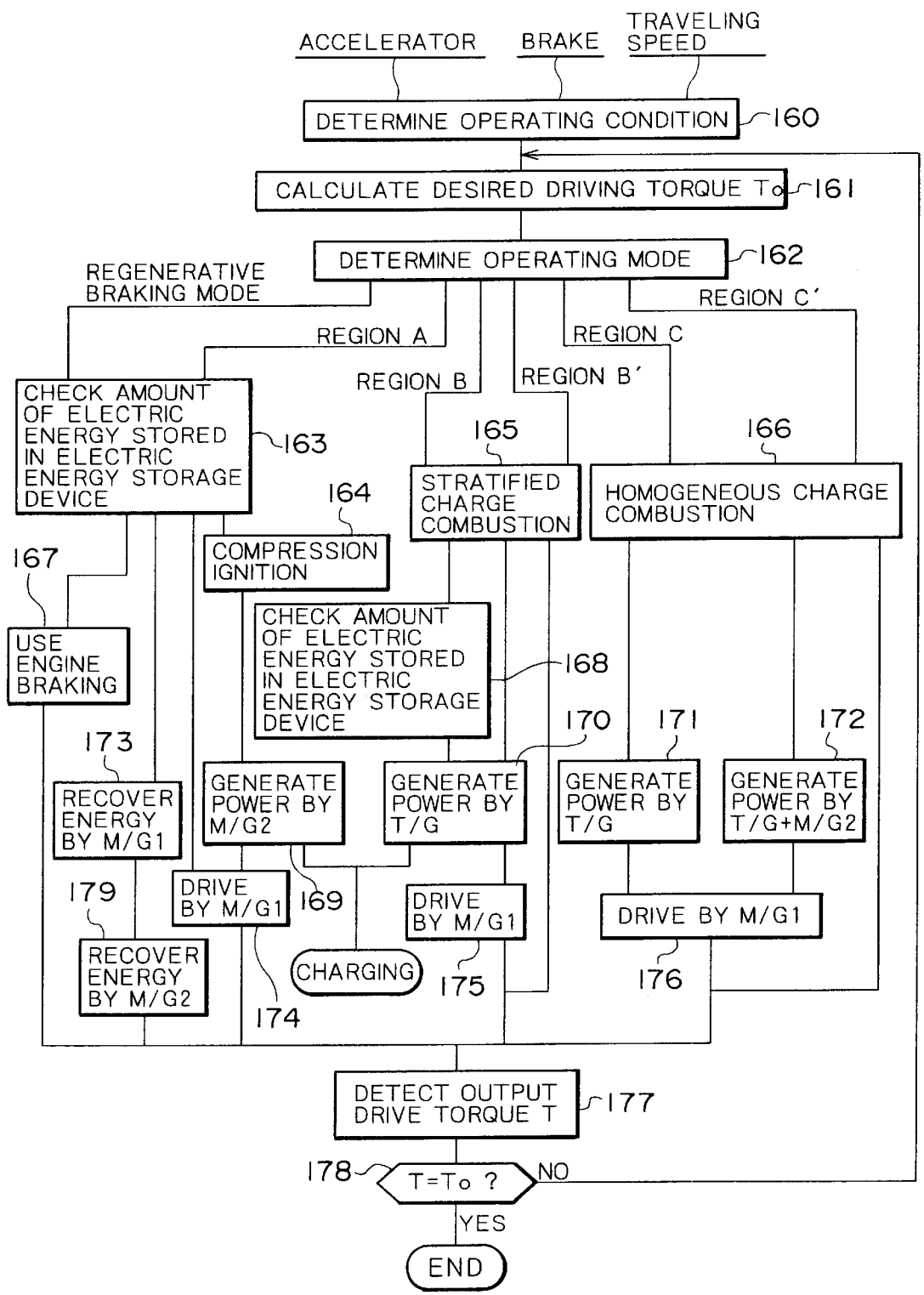
FIG. 16 is a flow chart of a control procedure to be carried out by the hybrid vehicle driving system shown in FIG. 13.

FIG. 16 shows a control procedure in this embodiment. In block 160, an operating condition of the HEV is determined on the basis of a set of data including an accelerator pedal displacement, a brake pedal displacement and a traveling speed, and a desired driving torque is calculated in block 161. In block 162, an operating mode is determined on the basis of the desired driving torque and the traveling speed. When the operating mode is in the region A, the amount of electric energy stored in the electric energy storage device 5 is checked in block 163. If the electric energy storage device 5 is insufficiently charged, the engine 10 is operated in the compression ignition mode in block 164 to generate power by the motor generator in block 169. If the electric energy storage device 5 is fully charged, the engine 10 is stopped. When the engine 10 is operated, the electric energy converter controller 1 gives a voltage control signal to the electric energy converter 16 of the motor/generator 17. Since the motor/generator 17 is assumed to be, an ac generator, the electric energy converter 16 is an ac-dc converter for converting ac electric energy generated by the motor/generator 17 into corresponding dc electric energy. If the motor/generator 17 is a dc generator, the electric energy converter 16 is a dc-dc converter, and the controller 1 executes a voltage changing control operation to change a voltage to a predetermined voltage. As shown in block 174, the motor/generator 19 produces a driving force for traveling in the region A.

In the region B, the engine 10 is operated in the stratified charge combustion mode in block 165 and the motor/generator 19 does not produce any driving force. In block 168, the amount of electric energy stored in the electric energy storage device 5 is checked. If the electric energy storage device 5 is insufficiently charged, power is generated (block 170) by the turbogenerator 7 combined with the exhaust pipe 9 of the engine 10 to charge the electric energy storage device 5. The region B has a special region B' for special conditions, i.e., transient conditions under which the engine is operated when the operating condition of the engine changes from that in the region B to that in the region C. In the region B', the engine 10 operates constantly in the stratified charge combustion mode and the motor/generator 19 is driven (block 175) to assist the engine 10 for providing a desired torque.

In the region C, the engine 10 is operated in the homogeneous charge combustion mode in block 166, the motor/generator 19 is driven in block 176 to provide an supplementary torque. Electric energy is supplied to the motor/generator 19 only by the turbogenerator 7 (block 171) in the region C', and by both the turbogenerator 7 and the generator 17 (block 172) in the region C.

Basically, the motor/generators 17 and 19 recover energy in blocks 173 and 179 when the brake system is operated. When it is confirmed in block 163 that the electric energy storage device 5 is fully charged, the motor/generators 17 and 19 are not used for regenerative braking operation and the braking effect of the engine 10 is used in block 167. In any one of those modes, the output driving torque T is measured in block 177 and the foregoing operations are repeated until the output driving torque T coincides with the desired driving torque To (block 178).

Figure 17:
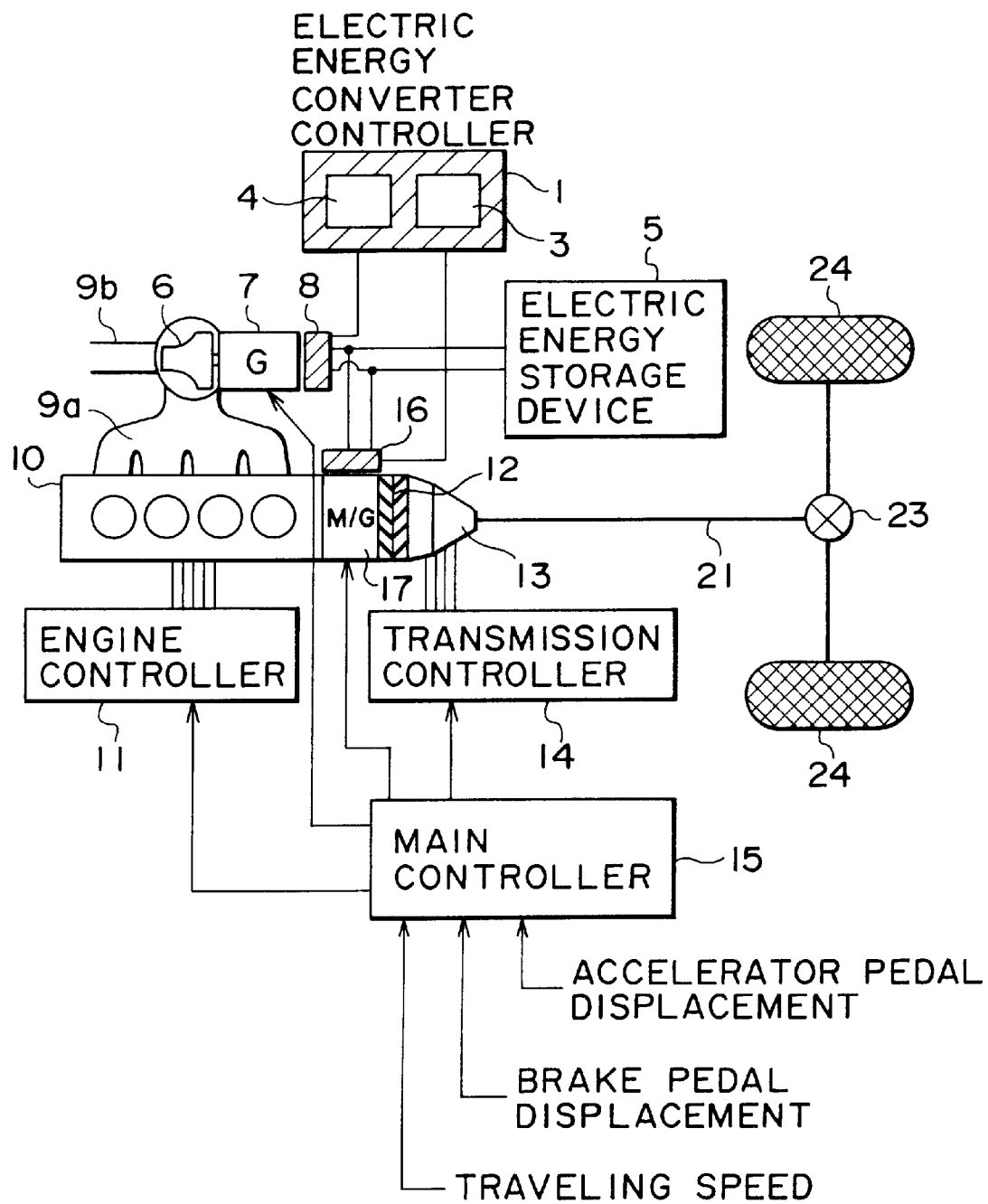
FIG. 17 is a block diagram of a hybrid vehicle driving system in a third embodiment according to the present invention.

A further embodiment of the present invention will be described. FIG. 17 shows an HEV driving system in a third embodiment according to the present invention. The HEV driving system comprises an engine 10, a motor/generator 17 interposed between the engine 10 and a clutch 12, and a turbogenerator 7 combined with the exhaust system 9 of the engine 10 to generate power by using the energy of the exhaust gas. A transmission 13 is connected to the engine 10 and the output shaft of the motor/generator 17. The HEV driving system further comprises an electric energy converter 8 for controlling the voltage of electric energy generated by the turbogenerator 7, an electric energy converter 16 for controlling the voltage of electric energy generated by the motor/generator, an electric energy storage device 5 connected to the electric energy converters to store electric energy, and an electric energy converter controller 1 for controlling the voltages of the electric energy converters and controlling a charging operation for charging the electric energy storage device. Desirably, the engine is similar to that included in the first embodiment.

Figure 18:
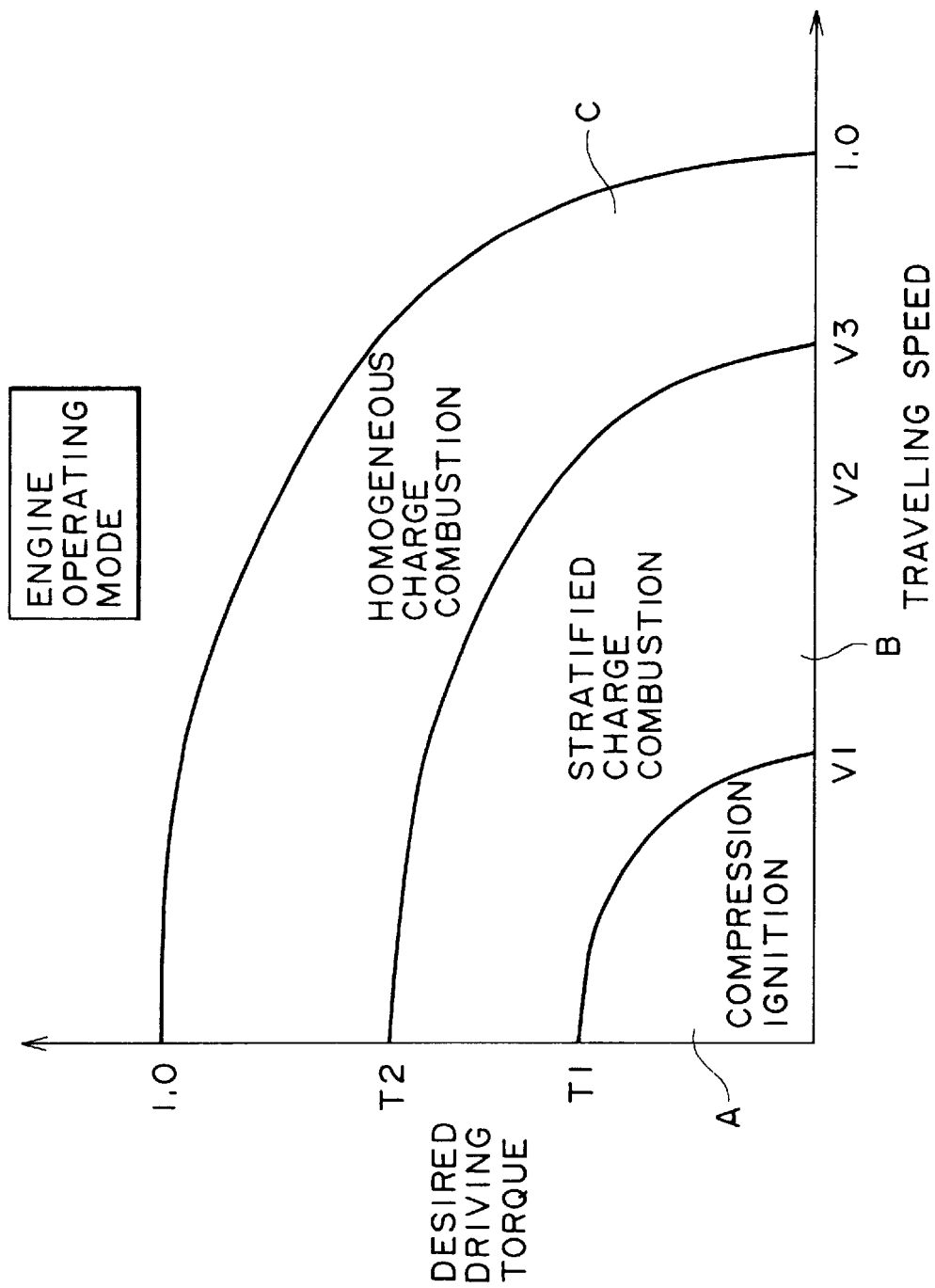
FIG. 18 is diagram of assistance in explaining an engine-drive mode for the hybrid vehicle driving system shown in FIG. 17.

The operation of the third embodiment will concretely be described hereinafter. A method of determining a desired driving torque for an HEV driven by the HEV driving system shown in FIG. 17 is the same as that previously explained with reference to FIG. 2. Engine operating modes for the engine of the HEV in this embodiment are shown in FIG. 18. The engine operating mode is determined on the basis of traveling speed and desired driving torque. The engine operating mode is divided roughly into regions A, B and C. Values of traveling speed and desired driving torque are normalized by maximum values for the HEV in this embodiment. The engine 10 is operated in the compression ignition mode, in the region A, in the stratified charge combustion mode in the region B and the homogeneous charge combustion mode in the region C. In this state, the engine 10 is operated at a fixed engine speed, the throttle valve is fully opened and the output of the engine 10 is controlled by controlling only fuel feed amount. This control is achieved by controlling power generating amount by an engine controller 11 for controlling the engine 10 on the basis of information provided by a main controller 15. The operating mode is changed through the stratified charge combustion mode (region A2) in which the fuel is injected into the cylinders, to the homogeneous charge combustion mode (region A3) to increase engine output. The air-fuel ratio of the mixture is 50 or above (superlean mixture) for the compression ignition mode, in the range of 30 to 50 (lean mixture) for the stratified charge combustion mode, and in the range of 14 to 15 (stoichiometric mixture) for the homogeneous combustion mode.

In the region B, the traveling speed is in the range of V1 to V3, the desired driving torque is not higher than T2, the engine is operated in the stratified charge combustion mode and the air-fuel ratio is in the range of 30 to 50.

In the range C, the air-fuel ratio is stoichiometric, and the engine 10 is operated in the homogeneous charge combustion mode to increase the engine torque.

Figure 19:
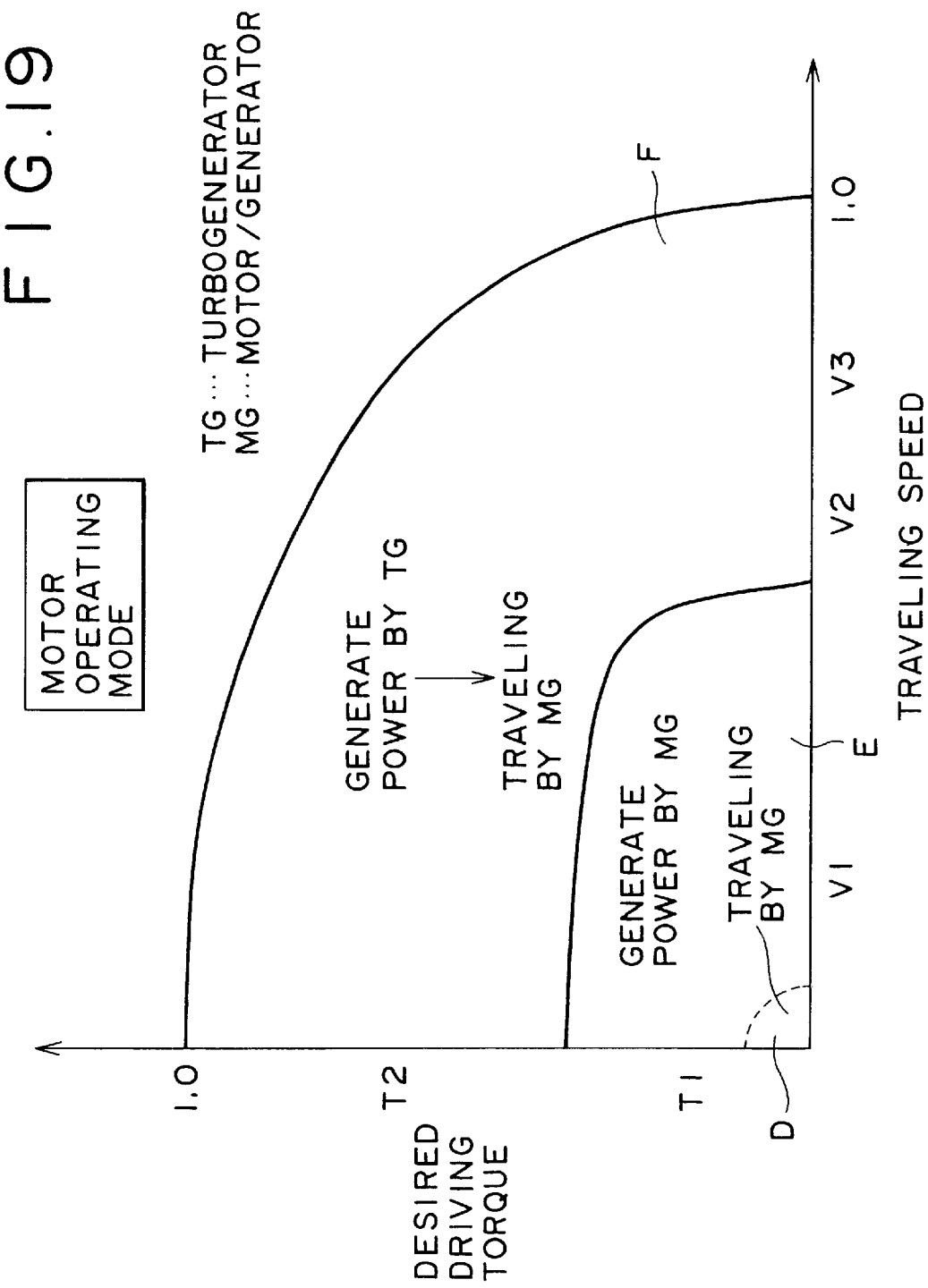
FIG. 19 is diagram of assistance in explaining a motor-drive mode for the hybrid vehicle driving system shown in FIG. 17.

FIG. 19 shows a motor operating mode for the HEV. The motor operating mode is determined on the basis of traveling speed and desired driving torque. The operating mode is divided roughly into regions D, E and F. Values of traveling speed and desired torque are normalized by maximum values for the HEV in this embodiment. In the region E, assistive torque production is not performed and power is generated continuously by using the output of the engine. The region D included in the region E is a low-engine-speed, low-load region. It is not desirable to operate the engine in the region D from the viewpoint of efficiency. Therefore, torque production is assisted by the motor/generator 17. In the region F, torque production must always be assisted by the motor/generator 17 and the turbogenerator supplies electric energy.

Figure 20:
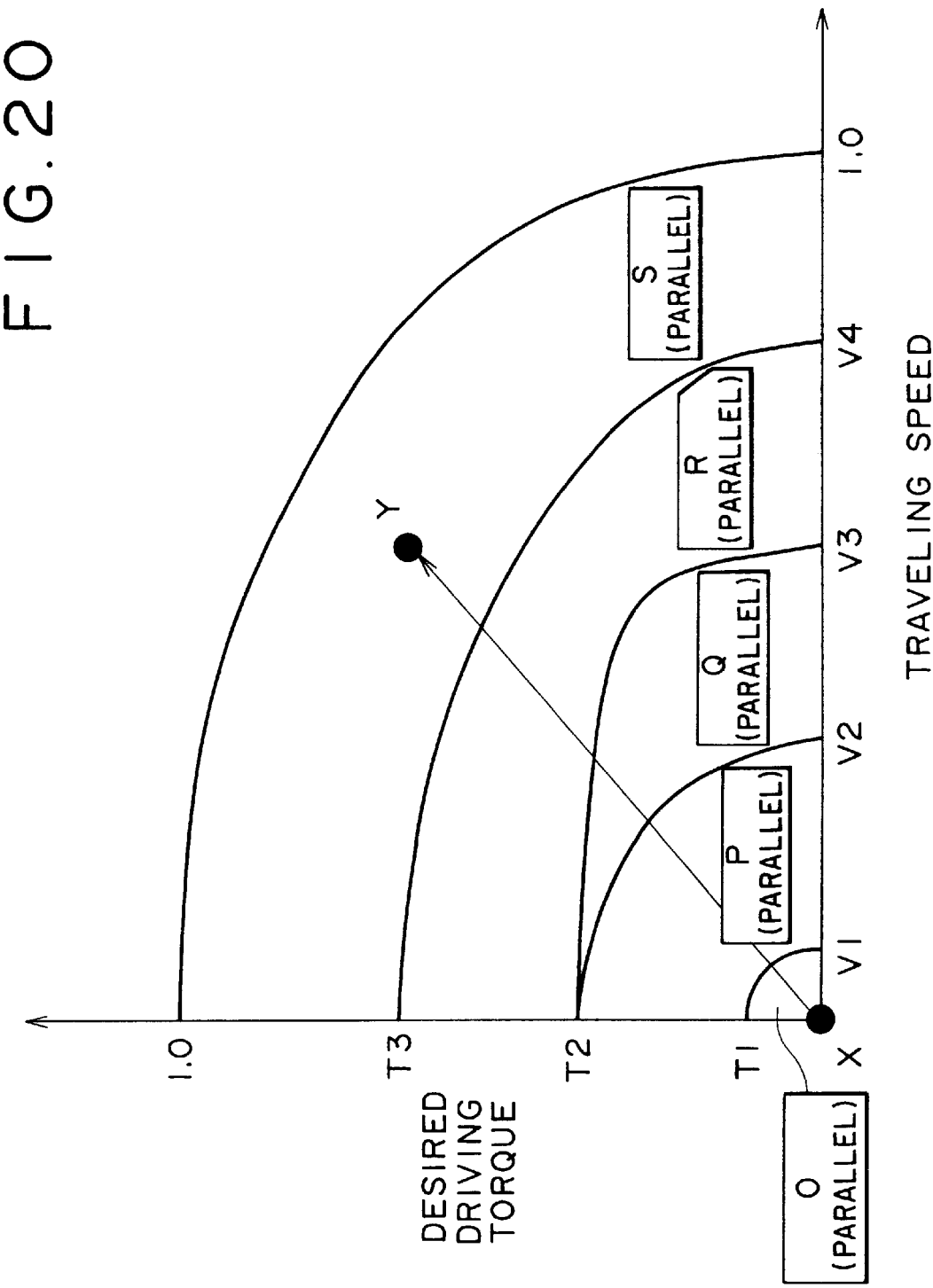
FIG. 20 is a diagram of assistance in explaining a series/parallel mode for the hybrid vehicle driving system of FIG. 17.

FIG. 20 shows an operating mode for the HEV in this embodiment. The operating mode is determined on the basis of traveling speed and desired driving torque. The operating mode is divided roughly into regions O, P, Q, R and S. Values of traveling speed and desired output torque are normalized by maximum values for the HEV in this embodiment.

Since the HEV driving system in this embodiment is provided with only on motor/generator, the HEV cannot operated as an SHEV. In the region O, the engine 10 is operated in the compression ignition mode and the motor/generator 17 produces an supplementary torque to assist the engine 10. In the region P, the engine 10 is operated in the compression ignition mode and the motor/generator 17 generates power. In the region Q, the engine 10 is operated in the stratified charge combustion mode and the motor/generator 17 generates power. In the region R, the engine 10 is operated in the stratified charge combustion mode, the turbogenerator 7 generates power and the motor/generator 17 produces an supplementary torque to assist the engine 10. In the region S, the engine is operated in the homogeneous charge combustion mode, the turbogenerator generates power and the motor/generator 17 produces an supplementary torque to assist the engine 10.

Figure 21:
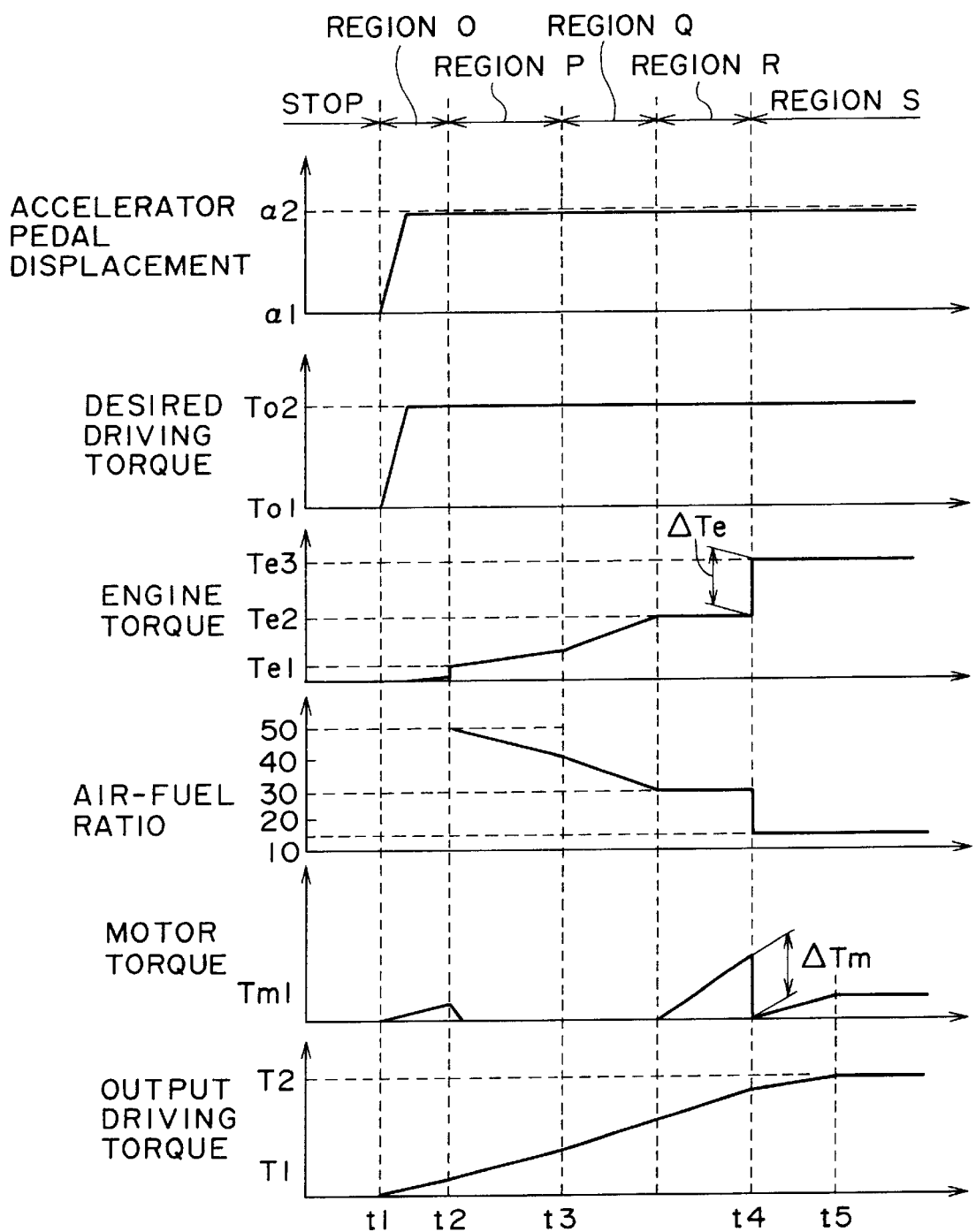
FIG. 21 is a time chart of assistance in explaining the variation of parameters when the operating condition of the hybrid vehicle driving system shown in FIG. 17 changes.

FIG. 21 is a time chart showing control operations of a control system. A characteristic operation of this embodiment will be described on an assumption that the desired output torque changed from a value indicated by a point X to that indicated by a point Y in FIG. 20. While the engine 10 is stopped in a condition in the region O, the accelerator pedal is not displaced and any output driving torque is not produced. When the accelerator pedal is operated at time t1, a desired driving torque To2 corresponding to an accelerator pedal displacement is determined. In this state immediately after the start of the engine 10, air-fuel ratio is unstable. In this region, the motor/generator 17 produces a supplementary torque to assist the engine 10. The operating condition of the engine 10 changes to an operating condition in the region P by time t2, in which air-fuel ratio is stable and the torque of the engine increases and hence the motor/generator 17 stops producing the supplementary torque. In the region P, the motor generator 17 is driven for power generation by part of the output torque of the engine. Power generating amount is adjusted by slightly reducing air-fuel ratio to increase the output torque of the engine. After air-fuel ratio is adjusted to 30, engine torque is kept constant and motor torque is produced. An air-fuel ratio changing control operation is performed at time t4 when the motor torque difference $\Delta Tm$ becomes approximately equal to the engine torque difference $\Delta Te$ so that the output driving torque varies smoothly. In the region S, the engine 10 is operated in the homogeneous charge combustion mode, electric energy generated by the turbogenerator 7 is supplied to the motor/generator 17 and the desired driving torque is produced at time t5.

Figure 22:
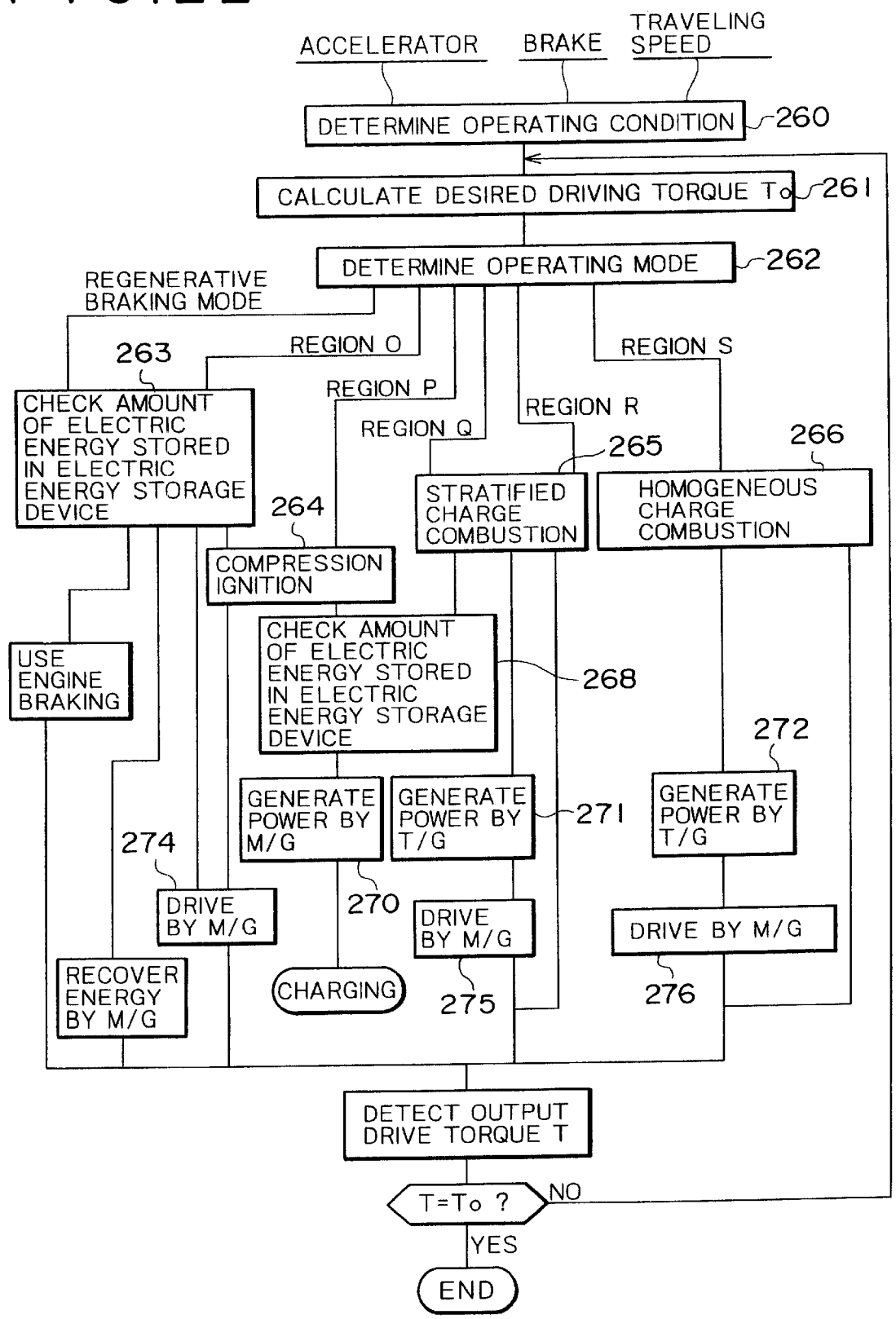
FIG. 22 is a flow chart of a control procedure to be carried out by the hybrid vehicle driving system shown in FIG. 17.

FIG. 22 shows a control procedure in this embodiment. In block 260, an operating condition of the HEV is determined on the basis of a set of data including an accelerator pedal displacement, a brake pedal displacement and a traveling speed, and a desired driving torque is calculated in block 261. In block 262, an operating mode is determined on the basis of the desired driving torque and the traveling speed.

When the operating mode is in the region O, the amount of electric energy stored in the electric energy storage device 5 is checked in block 263. If the electric energy storage device 5 is sufficiently charged, the engine 10 operating in the compression ignition mode in block 264 is assisted by a supplementary torque (block 274).

In the region P, the engine 10 is operated in the compression ignition mode in block 264 to drive the vehicle. The motor/generator 17 does not produce any driving force. The amount of electric energy stored in the electric energy storage device 5 is checked in block 268. If the electric energy storage device 5 is insufficiently charged, the electric energy storage device 5 is charged by using the output of the engine in block 270.

In the regions Q and R, the engine 10 is operated in the stratified charge combustion mode in block 265. In the region Q, the motor/generator 17 does not produce any driving force. The amount of electric energy stored in the electric energy storage device 5 is checked in block 268. If the electric energy storage device 5 is insufficiently charged, power is generated by using the output of the engine in block 270 to charge the electric energy storage device 5. In the region R, power is generated by the turbogenerator 7 in block 271 and the electric energy generated by the turbogenerator 7 is used for generating an supplementary torque by the motor/generator in block 275 to assist the engine.

In the region S, the engine is operated in the homogeneous charge combustion mode in block 266. The turbogenerator 7 generates power in block 272, and the motor/generator is operated in block 276 by using electric energy generated by the turbogenerator 7 to produce a supplementary torque to assist the engine.

Figure 23:
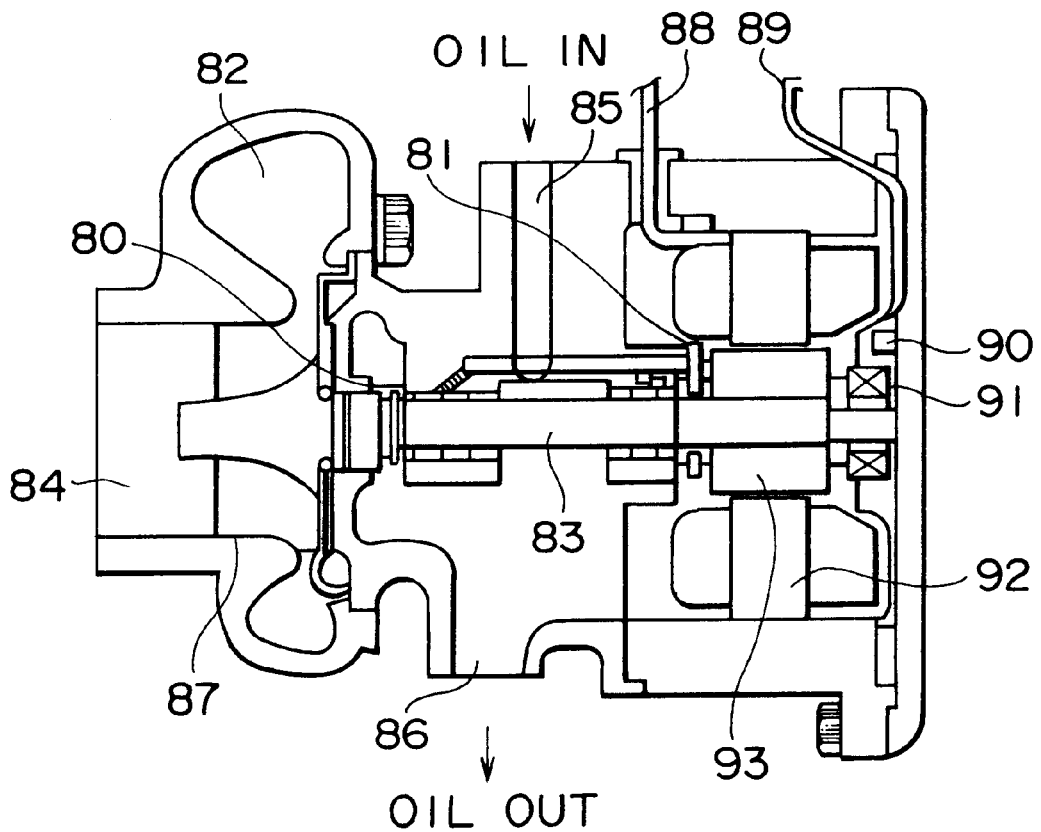
FIG. 23 is a sectional view of a turbogenerator to be employed in an embodiment of the present invention.

FIG. 23 shows a turbogenerator to be employed in the present invention. The turbogenerator comprises a shaft 83, a turbine wheal 87 (6 in FIG. 1) mounted on the shaft 83, a field magnet rotor 89,93 mounted on the shaft 83, a radial bearing 80, a thrust bearing 81, an angular position sensor 90, a shaft seal 91 and a stator 88,92. An oil is supplied through an oil supply port 85 to cool and lubricate the shaft 83, and is discharged through a discharge port 86. The exhaust gas (8a in FIG. 1) discharged from the engine flows into a turbine chamber 82 housing the turbine wheel 87 to drive the turbine wheel 87. The exhaust gas is discharged through an discharge opening 84 (9b in FIG. 1).

Figure 24:
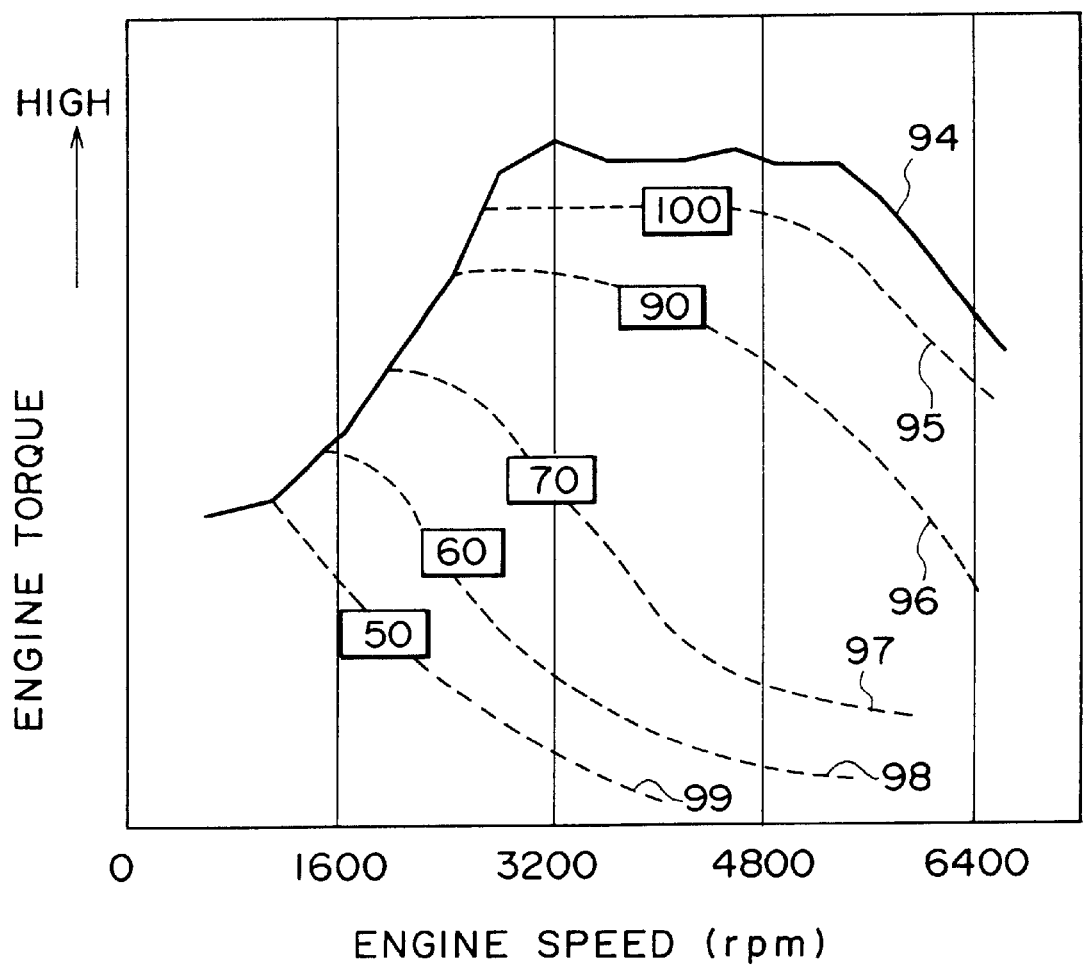
FIG. 24 is a graph showing the exhaust heat recovering ability of the turbogenerator shown in FIG. 23.

FIG. 24 shows amount of heat that can be recovered from the exhaust gas by the turbogenerator employed in the present invention. FIG. 24 shows the relation between engine speed and engine torque. In FIG. 24, a curve 94 indicates the output torque characteristic of the engine, dotted lines 95 to 99 connect points indicating the same amount of recovered heat, and numerals enclosed by a rectangle indicates the ratio of the amount of recovered exhaust heat to that indicated by the dotted line 95. A greater amount of exhaust heat can be recovered when the engine torque is higher.

Figure 25:
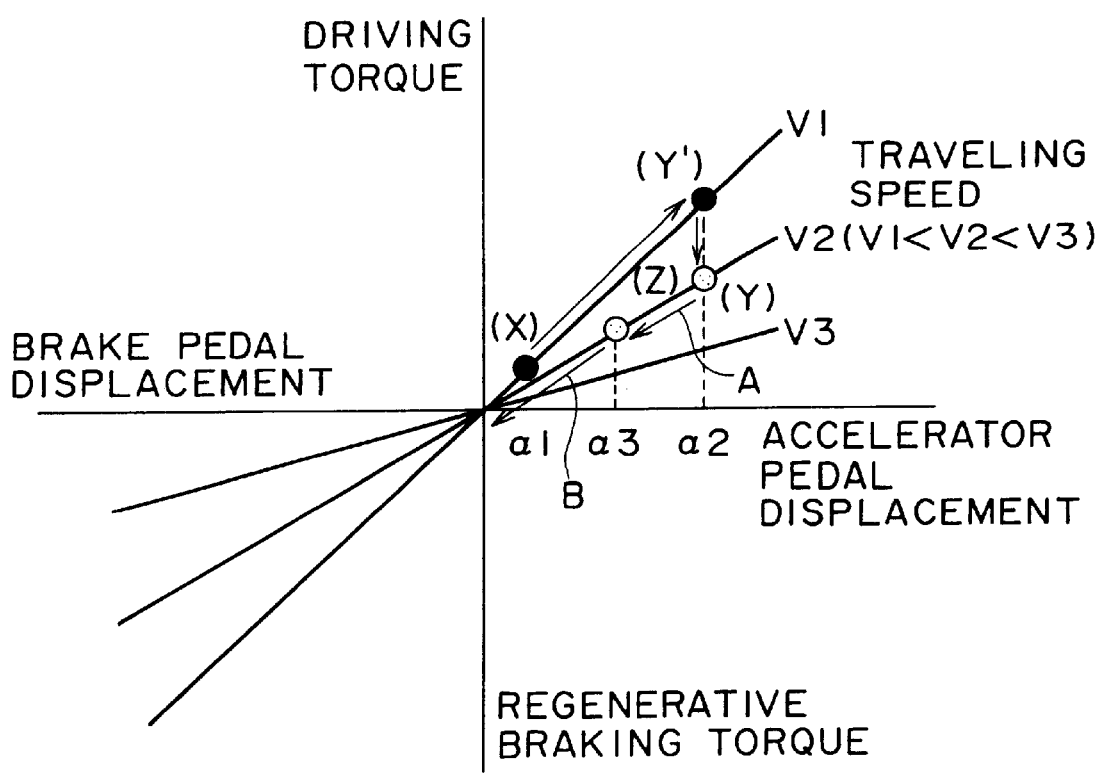
FIG. 25 is a diagram showing the relation between accelerator pedal displacement, brake pedal displacement, driving torque and regenerative torque.

FIG. 25 shows the relation between accelerator pedal displacement and brake pedal displacement, and driving torque and regenerative braking torque. Suppose that the accelerator pedal is depressed while the HEV is traveling at a low traveling speed V1 to accelerate the HEV for steady-state traveling at an increased traveling speed V2. The HEV is in a steady-state traveling at the traveling speed V1 in a state X, and the same is in a steady-state traveling at the traveling speed V2 in a state Z. When an accelerator pedal displacement $\alpha 1$ in the state X is increased to an accelerator pedal displacement $\alpha 2$, the traveling speed changes scarcely immediately after the increase of accelerator pedal displacement and the desired driving torque is equal to that in a state Y' shown in FIG. 25. Since the traveling speed increases gradually, the desired driving torque is equal to that in the state Y. Details between the state X and the state Y are mentioned in connection with the description of the first embodiment with reference to FIGS. 1 to 12.

In the state Y, the traveling speed is V2 and the accelerator pedal displacement remains at $\alpha 2$. Consequently, the traveling speed increases further to V3. The accelerator pedal displacement must be reduced to maintain the traveling speed at V2. If the accelerator pedal displacement is reduced to $\alpha 3$, the traveling speed is maintained at V2 and the HEV travels in a steady-state traveling mode in the state Z. A state change A occurs between the state Y and the state Z. Reduction of accelerator pedal displacement in the state Z is a preparatory operation for braking and the HEV operates in the regenerative braking mode shown in FIGS. 11A and 11B. The state change A will be described.

Figure 26:
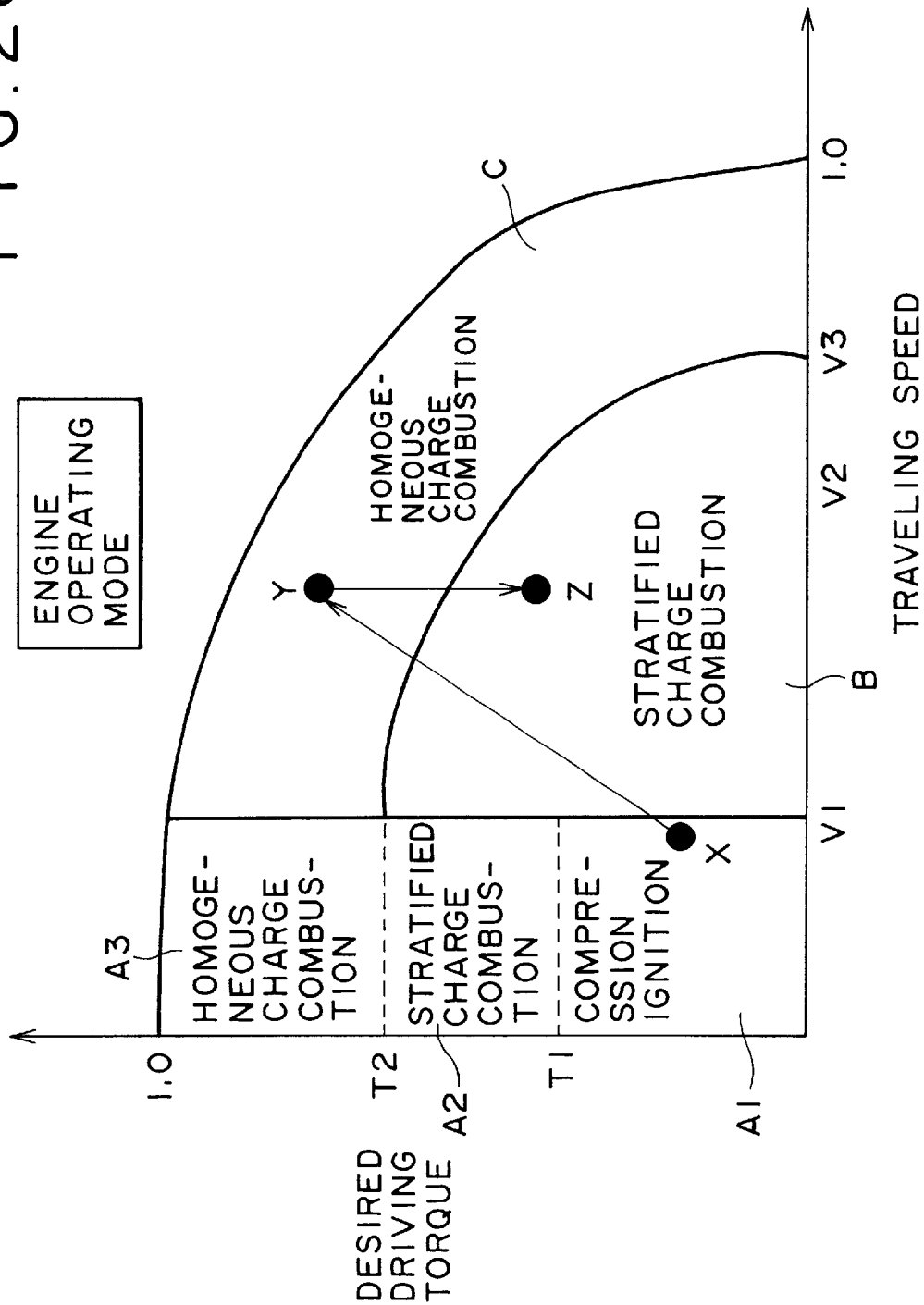
FIG. 26 is a graph showing change of operating condition.
Figure 27:
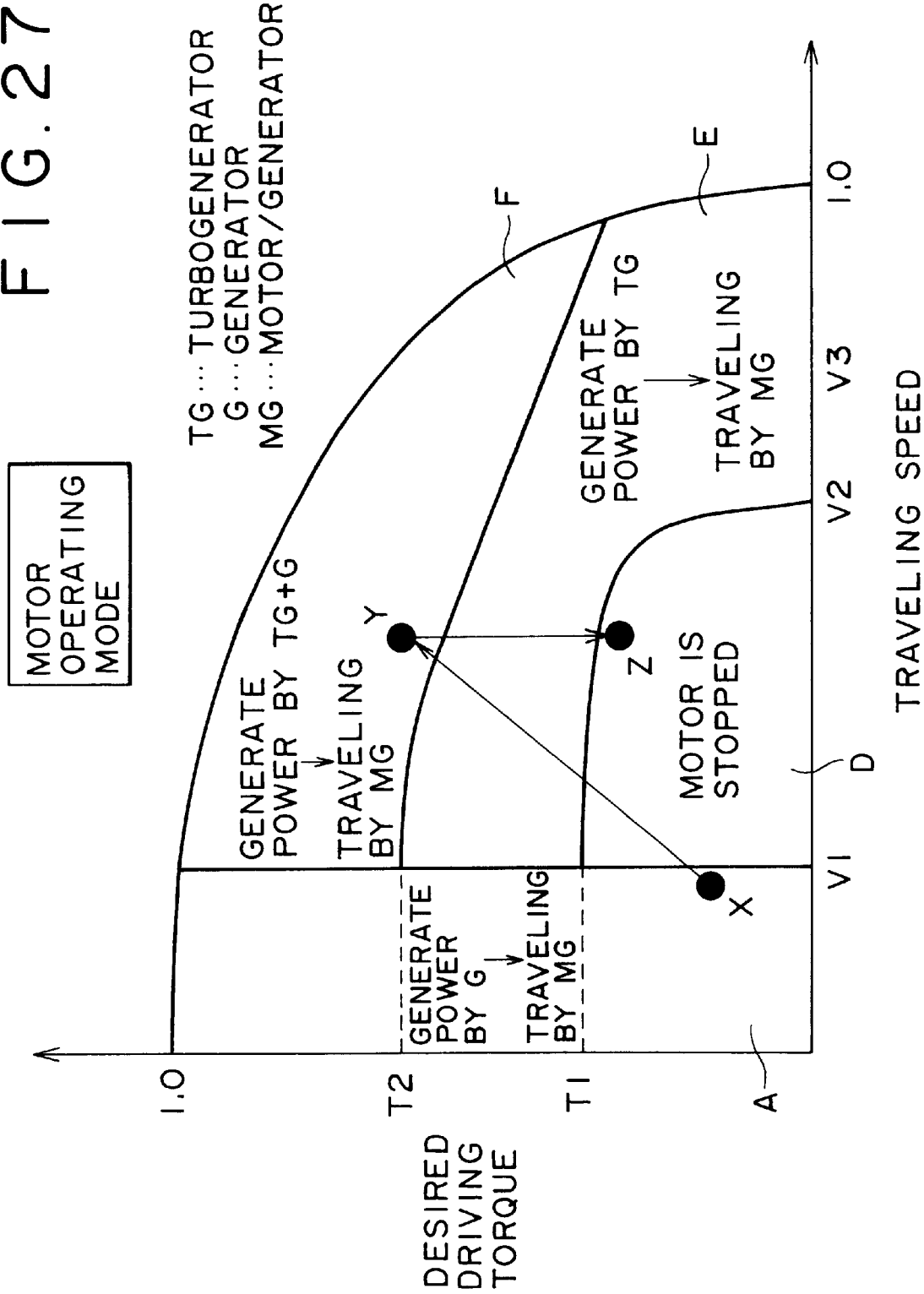
FIG. 27 is a graph showing change of operating condition.
Figure 28:
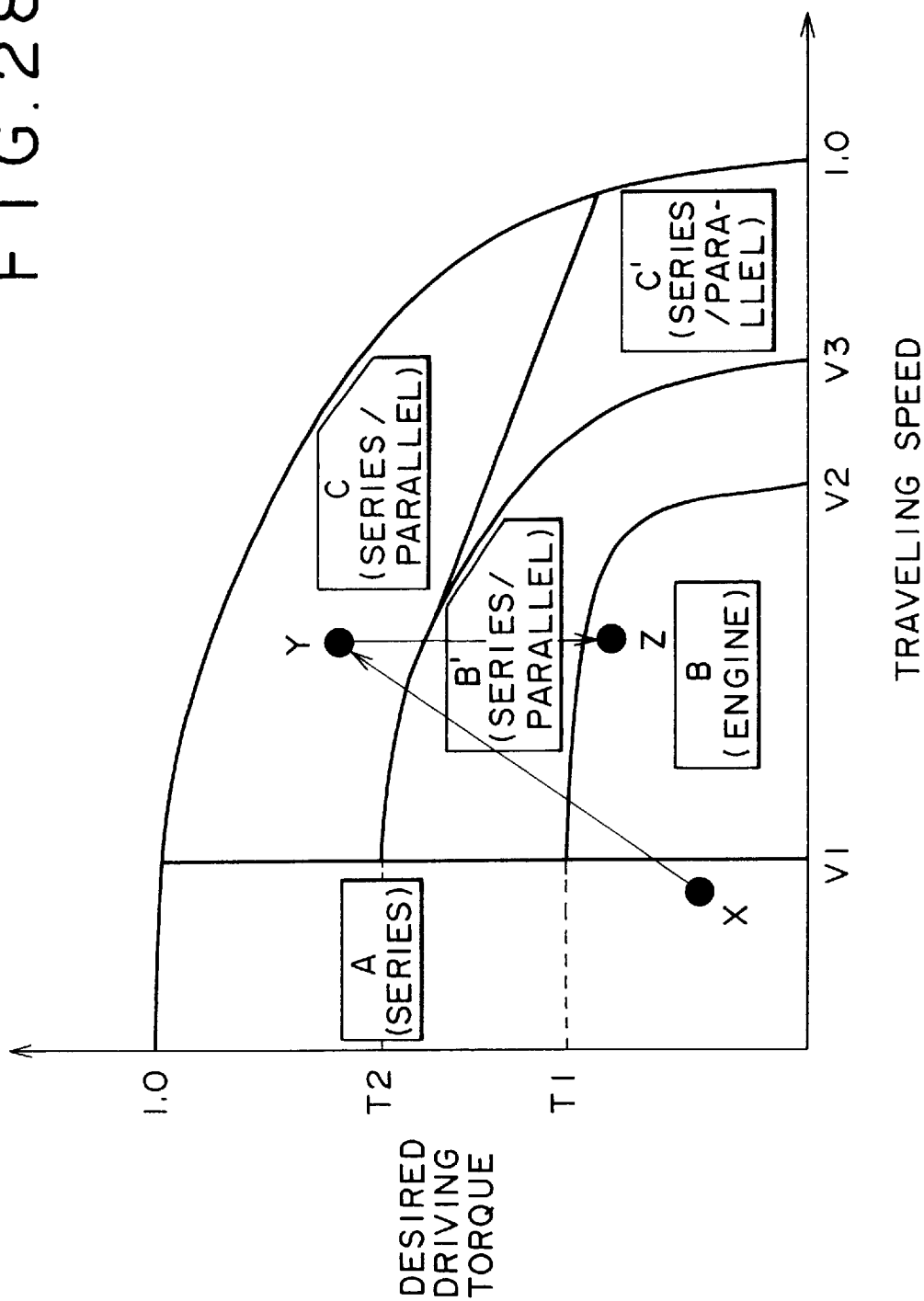
FIG. 28 is a graph showing operating condition change.

A state change X→Y→Z is illustrated in FIGS. 26, 27 and 28. Power sources to be used are shown in FIG. 28. When the operating state changes from the state Y to the state Z, the operating state changes from a series/parallel state changes to a state in which only the engine is used. FIG. 27 shows a motor operating mode. In the state Y, the turbogenerator and the generator are used for power generation, and the motor generator is used for driving. In the state Z the motor generator is stopped. FIG. 26 shows an engine operating mode. The engine is operated in the homogeneous charge combustion mode in the state Y and in the stratified charge combustion mode in the state Z.

FIG. 29 shows a change from the state Y to the state Z. In a region C in the state Y, accelerator pedal displacement is $\alpha 2$, desired driving torque is To2 and output driving torque is T2. The output driving torque T2 is the sum of an engine torque Te3 and a motor torque Tm1. When accelerator pedal displacement is changed from $\alpha 2$ to $\alpha 3$ to maintain the traveling speed, desired driving torque becomes To3, and the operating mode of the engine is changed from the homogeneous charge combustion mode to the stratified charge combustion mode, in which air-fuel ratio is changed from 14.7 to about 30. When the operating mode of the engine is changed, engine torque drops by $\Delta Te$. Therefore, a current command is changed to increase motor torque by $\Delta Tm$. Consequently, the operating condition can be changed from that in the region C to that in region B' without changing torque stepwise. After the region has been changed at time t1, air-fuel ratio is maintained at 30 until time t2, and the torque off the motor is reduced gradually to naught by the time t2. After the motor torque has been reduced to naught, air-fuel ratio is changed to 40 to reduce engine torque to an output driving torque T3 by time t3. Thus, operating region can smoothly be changed. Since electric power generated by using energy recovered from the exhaust gas by the turbogenerator is used to produce the torque increment $\Delta Tm$, the efficiency is not reduced by the changing control.

Industrial Application

The hybrid vehicle driving system according to the present invention having the means for combining the respective output torques of the internal-combustion engine and the motor or transmitting the output torque of the internal-combustion engine or that of the motor comprises the turbogenerator for converting the energy of the exhaust gas of the internal-combustion engine into electric energy, and the means for electrically connecting the turbogenerator and the electric motor, the engine of the HEV can be operated in the lean combustion mode for most part of its operating time and hence the fuel consumption rate and efficiency of the engine can be improved.

According to the present invention, a hybrid vehicle driving method operates an internal-combustion engine selectively in a first operating mode in which a mixture of an air-fuel ratio not lower than a predetermined first air-fuel ratio is supplied to the internal-combustion engine or a second operating mode in which a mixture of an air-fuel ratio not higher than a predetermined second air-fuel ratio lower than the first air-fuel ratio is supplied to the internal-combustion engine, and drives wheels by a composite torque produced by combining the respective output torques of the internal-combustion engine and an electric motor, wherein the electric motor is driven and maintains the air-fuel ratio of the mixture supplied to the internal-combustion engine at the first air-fuel ratio when the air-fuel ratio decreases below the first air-fuel ratio while the internal-combustion engine is operating in the first operating mode. Thus, the pre sent invention provides a HEV driving system capable of changing its operating condition in a lean combustion region to that in a stoichiometric combustion region without operating in an operating condition that produces $NO_x$ and provides an automobile that does not cause air contamination.

According to the present invention, a second air-fuel ratio engine torque that may be produced by the internal-combustion engine when a mixture of the second air-fuel ratio is supplied to the internal-combustion engine is estimated, a torque difference between an engine torque that may be produced when a mixture of the first air-fuel ratio is supplied to the engine and the estimated second air-fuel ratio engine torque is calculated, and the operating mode is changed from the first operating mode to the second operating mode when the output torque of the electric motor is approximately equal to the calculated torque difference. Thus, the present invention provides a driving method that does not change the torque suddenly and improves the performance of the automobile.

According to the present invention, a hybrid vehicle comprises an internal-combustion engine capable of operating in a compression ignition mode, a generator capable of converting the output energy of the internal-combustion engine into electric energy, and an electric motor capable of converting the electric energy generated by the generator into driving energy for driving driving wheels. Thus, a torque sufficient for driving a vehicle can be produced by the engine capable of producing a small torque and of operating in the compression ignition mode.

What is claimed is:

1. A hybrid vehicle driving system comprising:

an internal-combustion engine capable of selectively operating in a first operating mode in which a fuel mixture having an air-fuel ratio not lower than a first predetermined value is supplied to the internal-combustion engine, and a second operating mode in which a fuel mixture having an air-fuel ratio not higher than a second predetermined value, which is smaller than the first predetermined value is supplied to the internal-combustion engine;

an electric motor; and a transmission for producing a composite torque by combining an output torque of the internal-combustion engine and an output torque of the electric motor and transmitting the composite torque to driving wheels;

wherein the electric motor produces a torque that is applied to reduce the size of step increases or decreases in the output torque of the internal-combustion engine which occurs when the internal-combustion engine changes between the first operating mode and the second operating mode.

2. A hybrid vehicle driving method comprising:

operating an internal-combustion engine selectively in a first operating mode in which a mixture of an air-fuel ratio not lower than a first predetermined value is supplied to the internal-combustion engine, and a second operating mode in which a mixture of an air-fuel ratio not higher than a second predetermined value, which is smaller than the first predetermined value is supplied to the internal combustion engine;

combining respective output torques of the internal-combustion engine and an electric motor to generate a composite torque; and applying the combined torque to drive wheels of said vehicle;

wherein the electric motor is driven and the air-fuel ratio of the mixture supplied to the internal-combustion engine is maintained at the first value when the air-fuel ratio decreases below the first value while the internal-combustion engine is operating in the first operating mode.

3. The hybrid vehicle driving method according to claim 2, further comprising:

estimating a second air-fuel ratio engine torque that would be produced by the internal-combustion engine when a fuel mixture having the second air-fuel ratio is supplied thereto;

calculating a torque difference between an engine torque produced by the internal-combustion engine when a fuel mixture having the first air-fuel ratio is supplied thereto and the estimated second air-fuel ratio engine torque; and changing the operating mode of the internal-combustion engine from the first operating mode to the second operating mode when an output torque of the electric motor becomes approximately equal to the calculated torque difference.

4. The hybrid vehicle driving method according to claim 2, further comprising:

estimating a second air-fuel ratio engine torque produced by the internal-combustion engine when it is supplied with a mixture having the second air-fuel ratio; and changing the operating mode of the internal-combustion engine from the first operating mode to the second operating mode when the sum of an engine torque produced by the internal-combustion engine when a mixture of the first air-fuel ratio is supplied thereto and an output torque of the electric motor exceeds the estimated second air-fuel ratio engine torque.

5. The hybrid vehicle driving method according to claim 4, further comprising:

estimating the second air-fuel ratio engine torque, based on a driving torque variation that occurs when the operating mode of the internal-combustion engine changes from the first operating mode to the second operating mode.

* * * * *